US008660378B2

(12) United States Patent
Yabu et al.

(10) Patent No.: US 8,660,378 B2
(45) Date of Patent: Feb. 25, 2014

(54) IMAGE EVALUATING DEVICE FOR CALCULATING AN IMPORTANCE DEGREE OF AN OBJECT AND AN IMAGE, AND AN IMAGE EVALUATING METHOD, PROGRAM, AND INTEGRATED CIRCUIT FOR PERFORMING THE SAME

(75) Inventors: Hiroshi Yabu, Hyogo (JP); Kazuhiko Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 94 days.

(21) Appl. No.: 13/255,324

(22) PCT Filed: Dec. 16, 2010

(86) PCT No.: PCT/JP2010/007300
§ 371 (c)(1),
(2), (4) Date: Sep. 8, 2011

(87) PCT Pub. No.: WO2011/099108
PCT Pub. Date: Aug. 18, 2011

(65) Prior Publication Data
US 2011/0317928 A1    Dec. 29, 2011

(30) Foreign Application Priority Data

Feb. 10, 2010    (JP) .................................. 2010-027756

(51) Int. Cl.
*G06K 9/40*    (2006.01)

(52) U.S. Cl.
USPC ....................................................... 382/255

(58) Field of Classification Search
None
See application file for complete search history.

(56) References Cited

U.S. PATENT DOCUMENTS

| 6,748,097 B1 * | 6/2004 | Gindele et al. ................ 382/112 |
| 2005/0246623 A1 | 11/2005 | Ma et al. |
| 2006/0204120 A1 | 9/2006 | Poon et al. |
| 2007/0239778 A1 | 10/2007 | Gallagher |

(Continued)

FOREIGN PATENT DOCUMENTS

| JP | 2004-361989 | 12/2004 |
| JP | 2005-332385 | 12/2005 |

(Continued)

OTHER PUBLICATIONS

Kazuhiro Hotta et al., "Face Recognition Using Weighted Matching by Information of Gabor Features", Technical Report of the IEICE, pp. 31-38, May 2000, with English translation thereof.

(Continued)

*Primary Examiner* — Nirav G Patel
(74) *Attorney, Agent, or Firm* — Wenderoth, Lind & Ponack, L.L.P.

(57) ABSTRACT

Provided is an image evaluation apparatus for evaluating each of a plurality of images, the images including objects that each belong to a cluster. The image evaluation apparatus calculates (i) a first value pertaining to an object appearing in an image (for instance, the first value indicates a frequency at which the object appears in the plurality of images) according to a cluster that the object belongs to and (ii) a second value pertaining to the object (for instance, the second value indicates an occupation degree of the object in the image) according to an appearance characteristic that the object exhibits in the image. The image evaluation apparatus further calculates, according to the first value and second value, an importance degree of the object and an importance degree of the image.

11 Claims, 29 Drawing Sheets

(56) References Cited

U.S. PATENT DOCUMENTS

| | | |
|---|---|---|
| 2008/0065627 A1 | 3/2008 | Ma et al. |
| 2008/0080749 A1 | 4/2008 | Nonaka et al. |
| 2009/0111085 A1 | 4/2009 | Rudy et al. |
| 2011/0029887 A1* | 2/2011 | Pearson et al. ............... 715/743 |
| 2011/0142300 A1* | 6/2011 | Zhang et al. .................. 382/118 |
| 2012/0050789 A1* | 3/2012 | Bachman et al. ............ 358/1.15 |

FOREIGN PATENT DOCUMENTS

| | | |
|---|---|---|
| JP | 2006-172417 | 6/2006 |
| JP | 2007-49387 | 2/2007 |
| JP | 2007-80014 | 3/2007 |
| JP | 2007-135065 | 5/2007 |
| JP | 2008-84047 | 4/2008 |
| JP | 2009-104003 | 5/2009 |
| JP | 2009-533725 | 9/2009 |

OTHER PUBLICATIONS

"The PageRank Citation Ranking. Bringing Order to the Web", Jan. 29, 1998.

Tsuyoshi Murata, "Web Structure Mining and Discovery of Web Communities", IPSJ SIG Technical Report, pp. 85-90, May 31, 2006, with English translation thereof.

Mitsuru Ambai et al., "Multiclass VisualRank: Image Ranking Method in Clustered Subsets Based on Visual Features", IEICE Technical Report, pp. 183-188, Dec. 2008, with English translation thereof.

International Search Report issued Jan. 25, 2011 in International Application No. PCT/JP2010/007300.

* cited by examiner (a)

| | Image | Occupation degree of faces belonging to Person a | Occupation degree of faces belonging to Person b | Background occupation degree |
|---|---|---|---|---|
| | A | 0.3 | 0 | 0.7 |
| | B | 0.4 | 0.3 | 0.3 |
| | C | 0 | 0.3 | 0.7 |

29a 29b 29c 29d

28 Occupation degree storing unit

Image X

F5

F1: Occupation degree of F5 = 0.8
Frequency degree of F5 = 2
Importance degree of F5 = 0.8 × 2 = 1.6

↓

Image importance degree of image X = object importance degree of F1 = 1.6

Image Y

F6  F7  F8

F6: Occupation degree of F6 = V6

F7: Occupation degree of F7 = V7

F8: Occupation degree of F8 = V8

Image importance degree of image Y = importance degree of F6 + importance degree of F7 + importance degree of F8 = V6 + V7 + V8

FIG.20

$$M = \begin{pmatrix} 0 & 0.25 & 0.25 & 0.25 & 0.25 \\ 0.7 & 0 & 0 & 0.3 & 0 \\ 0.3 & 0 & 0 & 0.4 & 0.3 \\ 0.8 & 0.1 & 0.1 & 0 & 0 \\ 0.9 & 0 & 0.1 & 0 & 0 \end{pmatrix}$$

Comparison of frequency degrees

Image D: object belonging to person a and
object belonging to person d appear together Image D Comparison of evaluation scores Image E          Image F Comparison of image importance degrees Image S · Image A

F6 · F1

Importance degrees of F1 and F6 = frequency degree × occupation degree × smile degree

IMAGE EVALUATING DEVICE FOR CALCULATING AN IMPORTANCE DEGREE OF AN OBJECT AND AN IMAGE, AND AN IMAGE EVALUATING METHOD, PROGRAM, AND INTEGRATED CIRCUIT FOR PERFORMING THE SAME

TECHNICAL FIELD

The present invention relates to a technology for evaluating each of images included in a vast collection of images.

BACKGROUND ART

Recently, digital cameras have been gaining more popularity among users. Also, there has been a ceaseless increase in recording capacity provided to recording media. Such trends have brought about an increase in the number of images owned by a single user.

Among methods for supporting users in searching for and determining an image that he or she would like to view from among such an increasing number of images, one commonly-known method is a method of providing an evaluation and a rank to each of the images in a user's collection.

One example of such a method of evaluating and ranking images is a method of obtaining, for each image, a value indicating evaluation by performing calculation according to the number of times certain operations (printing, slideshow viewing, and etc.) have been performed with respect to the image (refer to Patent Literature 1).

In addition, there is another method of obtaining a value indicating a certain characteristic of an image by performing calculation, and further statistically obtaining a probability of whether or not the image will be selected for viewing by the user according to the value indicating a characteristic of the image (refer to Patent Literature 2).

Further in addition, yet another method of evaluating and ranking images is a method of detecting an orientation of one or more faces included in an image, and further obtaining a value indicating evaluation of the image according to the orientation so detected (refer to Patent Literature 3). When applying this method, an image having one or more faces which are oriented more towards the front of the image is provided with a high value of evaluation.

CITATION LIST

Patent Literature

[Patent Literature 1]
  Japanese Patent Application Publication No. 2007-135065
[Patent Literature 2]
  Japanese Patent Application Publication No. 2007-80014
[Patent Literature 3]
  Japanese Patent Application Publication No. 2004-361989

SUMMARY OF INVENTION

Technical Problem

However, when applying the method disclosed in Patent Literature 1, it is essential that a certain number of user operations have been made prior to the calculation of the evaluation value. That is, when no user operations or only a limited number of user operations have been made prior to the calculation of the evaluation value, the evaluation value obtained through the calculation will not be in accordance with user intentions.

Further, when applying the method disclosed in Patent Literature 3, images are evaluated solely according to the orientation of faces appearing therein. However, it is not always true that the orientation of faces in an image determines the importance of the image to the user.

In fact, it could be reasonably assumed that users would expect a good evaluation to be provided to an image in which a person who is important to the user is present, rather than to an image in which people's faces are facing in a desirable direction.

The present invention has been achieved in view of such problems, and an aim thereof is to provide an image evaluation apparatus which evaluates an image according to objects, such as people, appearing therein.

Solution to Problem

One aspect of the present invention is an image evaluation apparatus for evaluating each of a plurality of images, the images including objects that each belong to a cluster; the image evaluation apparatus comprising: a first value calculating unit that calculates a first value pertaining to an object appearing in an image according to a cluster that the object belongs to; a second value calculating unit that calculates a second value pertaining to the object according to an appearance characteristic that the object exhibits in the image; and an evaluating unit that calculates, according to the first value and the second value, an object importance degree and an image importance degree.

Advantageous Effects of Invention

According to the image evaluation apparatus which is one aspect of the present invention, evaluation of an image is performed according to objects appearing in the image, such as people's faces.

Additionally, the evaluating unit may include: an object importance degree calculating unit that calculates the object importance degree according to the first value and the second value; and an image importance degree calculating unit that calculates the image importance degree according to the object importance degree so calculated.

Further, the first value calculating unit may calculate a frequency degree as the first value, the frequency degree indicating a frequency at which one or more objects belonging to the same cluster as the object appear in the plurality of images, the second value calculating unit may calculate an occupation degree as the second value, the occupation degree indicating a proportion of an area of the image that is occupied by the object, and the object importance degree calculating unit may use the frequency degree and the occupation degree in order to calculate the object importance degree.

According to this, importance degrees are calculated by using both (i) a frequency degree having been calculated according to an object included in an image and (ii) an occupation degree indicating a proportion of an area of the image occupied by the object. Thus, the importance degrees obtained as a result of such calculation are in accordance with user expectations.

In addition, configuration may be made such that, when the image includes a first object and a second object, the first value calculating unit calculates a first frequency degree indicating a frequency at which one or more objects belonging to a same cluster as the first object appear in the plurality of images, and a second frequency degree indicating a frequency at which one or more objects belonging to a same cluster as the second object appear in the plurality of images, the second value calculating unit calculates a first occupation degree indicating a proportion of the area of the image that is occupied by the first object, and a second occupation degree indicating a proportion of the area of the image that is occupied by the second object, the object importance degree calculating unit calculates an importance degree of the first object according to the first frequency degree and the first occupation degree, and calculates an importance degree of the second object according to the second frequency degree and the second occupation degree, and the image importance degree calculating unit calculates the image importance degree according to the importance degree of the first object and the importance degree of the second object.

According to this, in a case where a first object and a second object appear in an image, the importance degree of the image is calculated according to importance degrees of both the first object and the second object. Hence, an image in which more than one person appears, for instance, is provided with a good evaluation.

Also, the object may be a human face appearing in the image

This feature makes the image evaluation apparatus pertaining to the present invention particularly suitable for evaluating images such as family photographs.

Further. when a first object and a second object appear in the image, the evaluating unit may calculate an importance degree for each of the two objects such that importance propagates from one of the two objects to the other.

As such, an importance of one object in an image influences another object in the image, and thus, the calculation of object importance degrees are performed while reflecting user expectations.

Further in addition, configuration may be made such that, when a total number of the images to be evaluated is P (P being a natural number), the first value calculating unit calculates Q (Q being a natural number) as the first value, Q denoting a total number of clusters that the objects appearing in the P images belong to, the second value calculating unit calculates, for each of the objects appearing in the P images, a value indicating an appearance characteristic that the corresponding object exhibits in the corresponding one of the P images as the second value, the image evaluation apparatus further comprises: a node creating unit that creates nodes including: P image nodes corresponding to the P images; and Q cluster nodes corresponding to the Q clusters that the objects appearing in the P images belong to; a link setting unit that sets a value of a link between an image node A corresponding to an image A and a cluster node a corresponding to a cluster a by using a second value pertaining to an object that appears in the image A and that belongs to the cluster a, where the image A is any one of the P images; and an adjacency matrix generating unit that generates an adjacency matrix representing a graph, the graph constituted of the nodes created by the node creation unit and values of the links between the image nodes and the cluster nodes set by the link setting unit, wherein the evaluating unit includes: an eigenvector calculating unit that calculates a dominant eigenvector for the adjacency matrix; and an importance degree calculating unit that calculates an importance degree for each of the P images according to the dominant eigenvector.

According to this, a "weight" of one node constituting the graph influences a "weight" of another node. For instance, propagation of importance takes place between an image and an object according to a link between an image node A and an object node a.

Also, the link setting unit may set a value of a link directed from the image node A to the cluster node a by using the second value and may set a value of a link directed from the cluster node a to the image node A without using the second value.

According to this, a value of a link directed from an image node A (a node corresponding to image A) to a cluster node a (a node corresponding to a cluster a, which is a cluster that an object appearing in image A belongs to) is set by using a value indicating a characteristic of the object in image A. Thus, for instance, when the object appears in a large size in image A, a large weight is accordingly provided to the link directed from the image node A to the cluster node a. This enables propagation of weight between nodes, where the propagation is directly linked with the content of the image A.

In addition the second value calculated by the second value calculating unit may be an occupation degree, the occupation degree indicating a proportion of an area that an object occupies in a corresponding one of the P images.

Further in addition, the second value calculating unit may calculate an occupation degree as the second value, the occupation degree indicating a proportion of an area of a corresponding one of the P images that is occupied by a background, a background being defined as an area of an image that does not include an object, the node creation unit may further create a dummy node Z, and the link setting unit may set a value of a link directed from the image node A to the dummy node Z by using the second value.

Also, the link setting unit may set a value of each of a link directed from the image node A to the cluster node a and a link directed from the cluster node a to the image node A by using the second value.

According to this, values of links between nodes are set according to the second value, which indicates a characteristic of an appearance of an object in an image. Thus, the propagation of importance between nodes is optimized.

Further, each of the plurality of images may be associated with a date and time of production, the image evaluation apparatus may further comprise: a receiving unit for receiving a specification of a range of dates and times from a user, and the first value calculating unit and the second value calculating unit may perform respective calculations only when an image is associated with a date and time of production falling within the specified range of dates and times.

According to this, the evaluating unit calculates importance degrees for objects and images which have been produced within the specified range of dates and times.

A second aspect of the present invention is an image evaluation method for evaluating each of a plurality of images, the images including objects that each belong to a cluster; the image evaluation method comprising: an acquiring step of acquiring information that indicates a cluster that an object appearing in an object belongs to; a calculating step of calculating a first value pertaining to the object according to the cluster that the object belongs to; a calculating step of calculating a second value pertaining to the object according to an appearance characteristic that the object exhibits in the image; and an evaluating step of calculating, according to the first value and the second value, an object importance degree and an image importance degree.

A third aspect of the present invention is a program for causing a computer to execute evaluation processing of each of a plurality of images, the images including objects that each belong to a cluster; the evaluation processing comprising: an acquiring step of acquiring information that indicates a cluster that an object appearing in an object belongs to; a calculating step of calculating a first value pertaining to the object according to the cluster that the object belongs to; a calculating step of calculating a second value pertaining to the object according to an appearance characteristic that the object exhibits in the image; and an evaluating step of calculating, according to the first value and the second value, an object importance degree and an image importance degree.

Finally, a fourth aspect of the present invention is an integrated circuit for evaluating each of a plurality of images, the images including objects that each belong to a cluster; the integrated circuit comprising: a first value calculating unit that calculates a first value pertaining to an object appearing in an image according to a cluster that the object belongs to; a second value calculating unit that calculates a second value pertaining to the object according to an appearance characteristic that the object exhibits in the image; and an evaluating unit that calculates, according to the first value and the second value, an object importance degree and an image importance degree.

BRIEF DESCRIPTION OF DRAWINGS

FIG. 8 illustrates a data structure of occupation degree information.

FIG. 20 illustrates an adjacency matrix M.

DESCRIPTION OF EMBODIMENTS

[Embodiment 1]

Embodiments of the present invention are described below with reference to the accompanying drawings.

<Structure>

Figure 1:
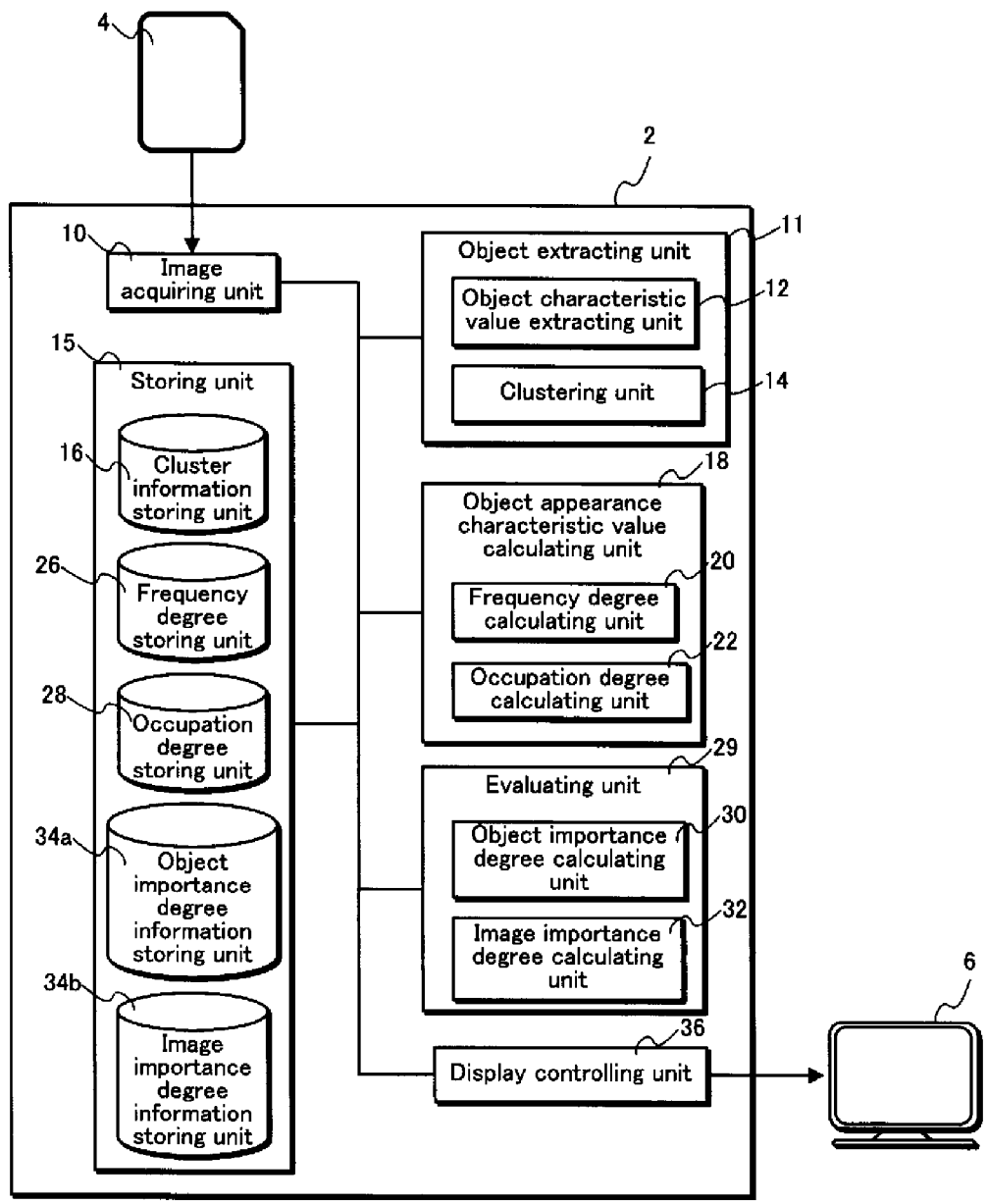
FIG. 1 is a functional block diagram of an image evaluation system 1.

As is illustrated in FIG. 1, an image evaluation system 1 includes an image evaluation apparatus 2, an SD memory card 4, and a display 6.

The image evaluation apparatus 2 includes: an image acquiring unit 10; an object extracting unit 11 (including: an object characteristic value extracting unit 12 and a clustering unit 14); a storing unit 15 (including: a cluster information storing unit 16, a frequency degree storing unit 26, an occupation degree storing unit 28; an object importance degree information storing unit 34a; and an image importance degree information storing unit 34b); an object appearance characteristic value calculating unit 18 (including: a frequency degree calculating unit 20 and an occupation degree calculating unit 22); an evaluating unit 29 (including: an object importance degree calculating unit 30 and an image importance degree calculating unit 32); and a display controlling unit 36.

The image acquiring unit 10 is composed of an SD card reader having an SD card slot, and obtains image data from the SD memory card 4 which is inserted into the SD card slot.

The object characteristic value extracting unit 12 extracts, from the image data acquired by the image acquiring unit 10, an image characteristic value of an object appearing in an image included in the image data. Further, the object characteristic value extracting unit 12 outputs the image characteristic value of an object so extracted as an object characteristic value.

In the following, description is provided, taking a human face appearing in an image as an example of an object.

The extraction of an image characteristic value of a human face appearing in an image may be performed by calculation according to an extraction method which involves the use of the Gabor filter. For details concerning the Gabor method, refer to Referenced Document 1, which is provided in the following.

The clustering unit 14 performs clustering according to the object characteristic value output from the object characteristic value extracting unit 12. Further, the clustering unit 14 causes the cluster information storing unit 16 to store cluster information indicating the result of the clustering. Here, the k-means clustering method (refer to Referenced Document 1)

may be applied as the clustering method. The k-means method is one of the non-hierarchical clustering methods (methods of clustering where clustering is performed by associating each fixed cluster with a cluster representative).

The storing unit 15 includes: the cluster information storing unit 16; the frequency degree storing unit 26; the occupation degree storing unit 28; the object information importance degree information storing unit 34a; and the image importance degree information storing unit 34b. The storing unit 15 may be composed of a RAM, for example.

The object appearance characteristic value calculating unit 18 calculates an object appearance characteristic value according to the cluster information stored in the cluster information storing unit 16. The object appearance characteristic value indicates how objects belonging to a same cluster appear in images. In specific, the object appearance characteristic value is composed of two types of information, the two types of information being: (i) a "frequency degree" indicating a frequency at which objects belonging to the same cluster appear in the total number of images; and (ii) an "occupation degree" indicating a proportion of an image which is occupied by an object belonging to a cluster. The frequency degree and the occupation degree are respectively calculated by the frequency degree calculating unit 20 and the occupation degree calculating unit 22, both of which are included in the object appearance characteristic value calculating unit 18. Following the calculation, the object appearance characteristic value calculating unit 18 stores the frequency degree and the occupation degree to the frequency degree storing unit 26 and the occupation degree storing unit 28, respectively.

The object importance degree calculating unit 30 calculates, for each of the objects appearing in the images, an object importance degree which indicates the importance of the corresponding object. The object importance degrees are calculated by using the object appearance characteristic values (including frequency degrees and occupation degrees) calculated by the object appearance characteristic value calculating unit 18.

The object importance degree information storing unit 34a is composed of a RAM, for example, and stores object importance degree information which includes the object importance degrees calculated by the object importance degree calculating unit 30.

The image importance degree calculating unit 32 calculates an importance degree for each of the images (image importance degrees), according to the object importance degrees.

The image importance degree information storing unit 34b is composed of a RAM, for example, and stores image importance degree information which includes the image importance degrees calculated by the image importance degree calculating unit 32.

The display controlling unit 36 causes a screen of the display 6 to display the image importance degrees so calculated.

<Operation>

Explanation is provided in the following on processing up to the point where an image is evaluated.

Figure 2:
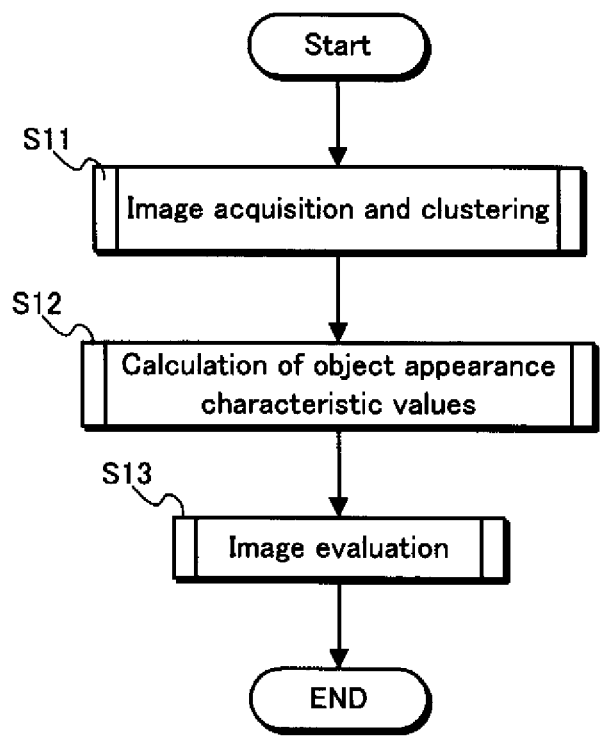
FIG. 2 is a flowchart illustrating an overview of image evaluation.

As is illustrated in FIG. 2, processing is executed in the order of: (i) image acquisition and clustering (S11); (ii) calculation of object appearance characteristic values (S12); and (iii) image evaluation (S13).

Figure 3:
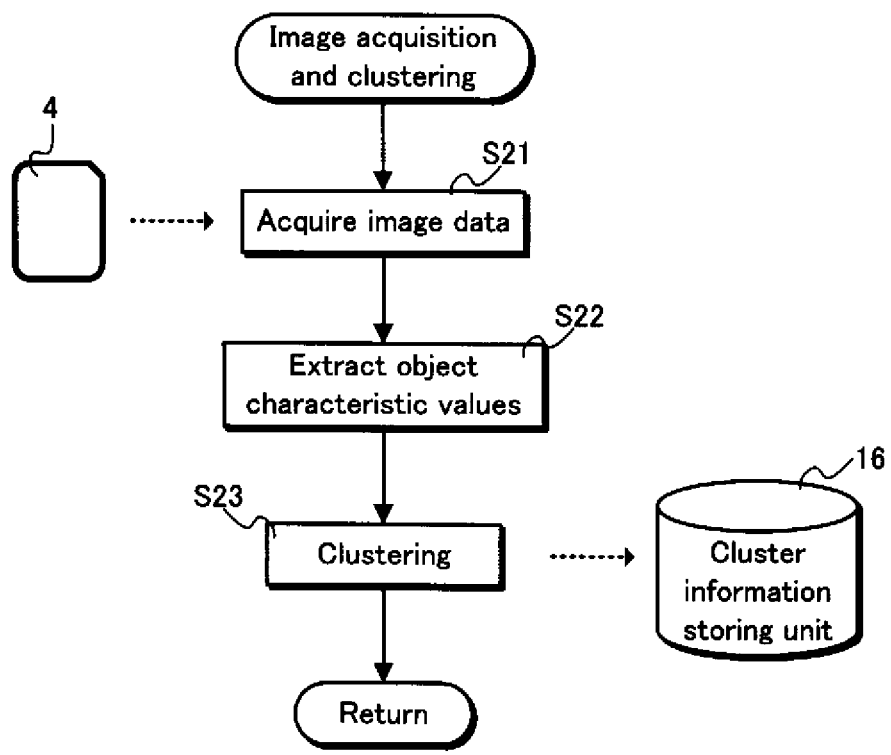
FIG. 3 is a flowchart illustrating details of image acquisition and clustering.

As is illustrated in FIG. 3, in the image acquisition and clustering, the image acquiring unit 10 acquires, from the SD memory card 4, image data stored therein (S21). In the following, description is provided taking as an example a case where the SD memory card 4 stores therein image data corresponding to three images, image A, image B, and image C. Hence, the image acquiring unit 10 acquires image data corresponding to images A through C.

Subsequently, the object characteristic value extracting unit 12 cuts out, from the images corresponding to the image data, portions corresponding to human faces. Further, the object characteristic value extracting unit 12 extracts, as the object characteristic value, a characteristic value from each of the faces (S22). Then, the clustering unit 14 performs clustering with respect to the object characteristic values so extracted, and stores cluster information indicating the result of the clustering to the cluster information storing unit 16 (S23).

Figure 4:
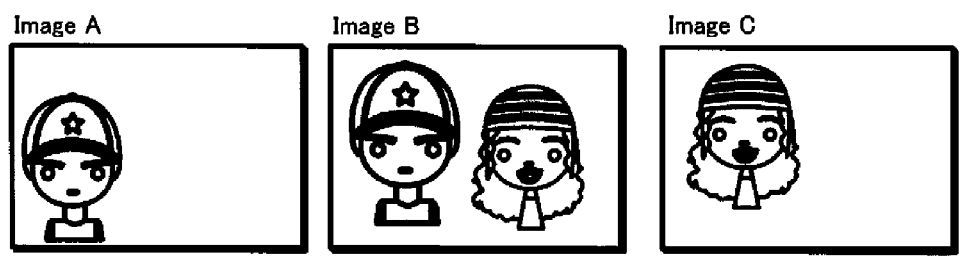
FIG. 4 illustrates how processing flows from extraction of object characteristic values to clustering of objects.
Figure 4:
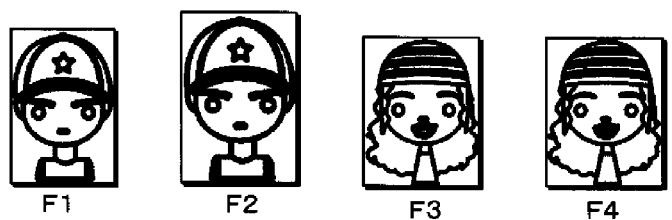
Figure 4:
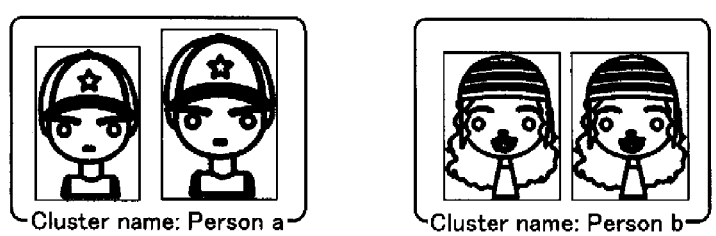

In the following, detailed explanation is provided of the processing in Steps S22 and S23 with reference to FIG. 4. The object characteristic value extracting unit 12 cuts out, from the three images: images A through C (FIG. 4, portion (a)), four faces: faces F1 through F4. Further, the object characteristic value extracting unit 12 extracts a characteristic value for each of the faces F1 through F4 (FIG. 4, portion (b)).

Subsequently, the clustering unit 14 performs clustering. Clustering is performed such that (i) the faces F1 and F2, which are similar to each other in appearance, are classified into a same cluster, which is Person a. Also, the faces F3 and F4, which also exhibit similarity with each other in appearance, are classified into a same cluster Person b, which is different from Person a.

Figure 5:
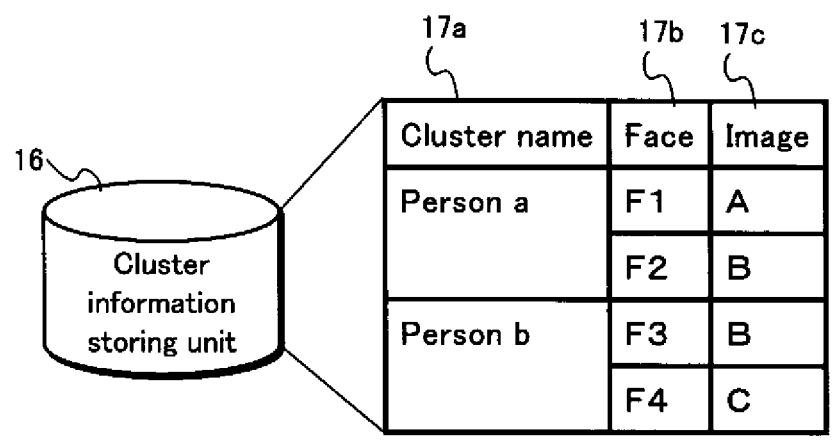
FIG. 5 illustrates a data structure of cluster information.

FIG. 5 illustrates a data structure of the cluster information indicating clustering results. The cluster information indicates the clusters to which each of the faces appearing in the images belongs, and includes the items: cluster name 17a; face 17b; and image 17c.

Figure 6:
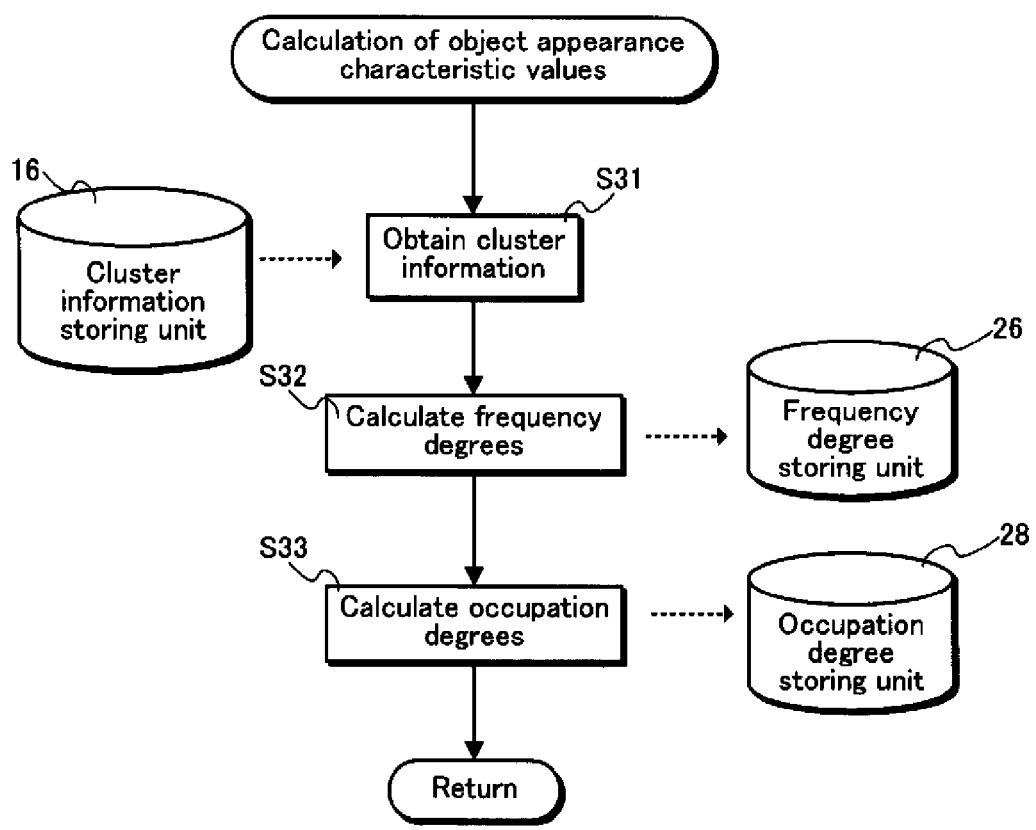
FIG. 6 is a flowchart illustrating details of calculation of an object appearance characteristic value.

Subsequently, detailed description is provided on the calculation of object appearance characteristic values (S12), with reference to FIG. 6. Firstly, the object appearance characteristic value calculating unit 18 obtains the cluster information from the cluster information storing unit 16 (S31).

The frequency degree calculating unit 20 calculates a frequency degree for each of the clusters, according to the cluster information obtained (S32). The frequency degree of a certain cluster is calculated by counting the number of times faces belonging to the cluster (faces having the same cluster name 17a) appear in the images. The frequency degree calculating unit 20 stores the frequency degree information including the frequency degrees so calculated to the frequency degree storing unit 26.

Figure 7:
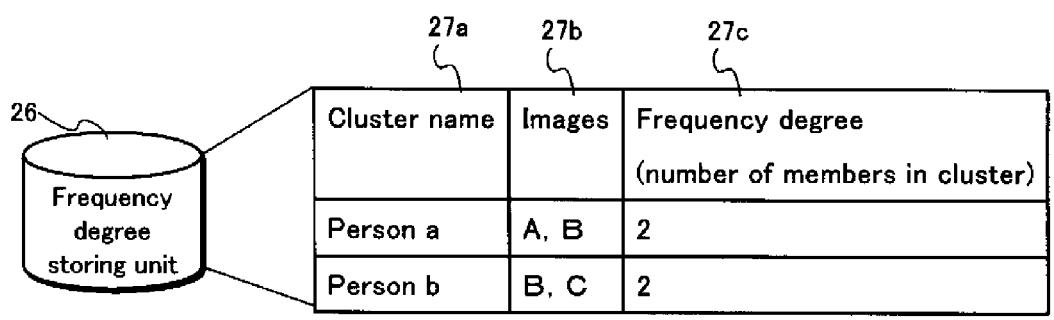
FIG. 7 illustrates a data structure of frequency degree information.

FIG. 7 illustrates a data structure of frequency degree information. The frequency degree information includes the items: cluster name 27a, images 27b, and frequency degree 27c. The value indicated in frequency degree 27c is obtained by counting the number of images belonging under images 27b.

In the example illustrated in FIG. 7, the frequency degree pertaining to the cluster Person a is 2, while the frequency degree pertaining to the cluster Person b is also 2. Here, since the frequency degree is obtained by counting the number of times faces belonging to the same cluster appear in the images, the frequency degree is indicative of, so to speak, the "number of members" belonging to the same cluster.

Now, description will be continued returning to FIG. 6 once again. The occupation degree calculating unit 22 calculates, for each of the faces appearing in the images, a proportion that a face occupies in a corresponding image. In addition, the occupation degree calculating unit 22 also calculates a proportion of each of the images occupied by the background. More specifically, in order as to calculate an occupation degree of a face in an image, occupation degree calculating unit 22 divides the surface area of the image occupied by the face by the total surface area of the image. As is already mentioned in the above, faces are extracted from the images by the object characteristic value extracting unit 12. For instance, when a face occupies 300,000 pixels in an image, and the total surface area of the image is 1,000,000 pixels, the proportion of surface area of the image occupied by the face is calculated as 300,000/1,000,000=0.3. Accordingly, the proportion of the image occupied by the background is calculated as 1−0.3=0.7. Subsequently, the occupation degree calculating unit 22 refers to the cluster information to determine the clusters each of the faces belong to. Thus, the occupation degree calculating unit 22 calculates occupation degrees, each of which indicating a proportion of an image occupied by a certain cluster, or that is, a certain person (S33). In addition, the occupation degree calculating unit 22 stores the occupation degree information, which includes the occupation degree so calculated, to the occupation degree storing unit 28.

FIG. 8 illustrates a data structure of the occupation degree information. The occupation degree information is composed of the items: image 29a, occupation degree of faces belonging to Person a 29b, occupation degree of faces belonging to Person b 29c, and background occupation degree 29d. The item occupation degree of faces belonging to Person a 29b indicates the occupation degree in each of the images of faces (objects) which belong to the Person a cluster. For instance, in image A, face F1 belongs to the Person a cluster (refer to FIG. 5), and the surface area occupied by face F1 is 30%. Therefore, the occupation degree of faces belonging to Person a in image A is calculated as 0.3.

Subsequently, detailed description is provided on image evaluation (S13) with reference to FIG. 9.

The object importance degree calculating unit 30 specifies one image as the evaluation target (S41). Further, the object importance degree calculating unit 30 respectively obtains the frequency degree and the occupation degree from the frequency degree storing unit 26 and the occupation degree storing unit 28 (S42). As description has already been made in the above, the frequency degree indicates the frequency at which one or more objects belonging to the same cluster as an object appearing in the target image appear in the images, whereas the occupation degree indicates a proportion of the target image occupied by the object.

The object importance degree calculating unit 30 calculates an object importance degree for an object appearing in the target image by multiplying the frequency degree and the occupation degree so obtained (S43).

When the object importance degree calculating unit 30 has not yet calculated an object importance degree for all objects appearing in the target image (S44: No), the processing returns to Step S43, and an object importance degree is calculated for each of the objects appearing in the target image whose object importance degree has not yet been calculated.

In short, Steps S42 through S44 are steps for calculating an object importance degree for each and every object appearing in the target image. For instance, when three objects appear in the target object, an object importance degree is calculated for each of the three objects. The object importance degrees which have been so calculated are stored to the object importance degree information storing unit 34a.

When an object importance degree has been calculated for every single object appearing in the image (S44: Yes), the image importance degree calculating unit 32 adds up the object importance degrees of all the objects appearing in the target image, and thereby calculates an image importance degree. Further, the image importance degree calculating unit 32 stores, as the image importance degree information, the calculated image importance degree to the image importance degree information storing unit 34b (S45). Note that this processing is performed with respect to all images.

When there exists an image whose image importance degree has not yet been calculated (S46: No), the processing returns to S41, where an image whose image importance degree has not yet been calculated is specified as the target image, and the image importance degree of such an image is calculated.

When image importance degrees have been calculated for every single image (S46: Yes), the display controlling unit 36 causes the screen of the display 6 to display the image importance degrees so calculated by using the image importance degree information stored in the image importance degree information storing unit 34b (S47). A commonly-known method can be applied in the displaying of the image importance degrees, which includes displaying image importance degrees as scores given to the images and displaying a ranking of the scores given to the images. Further, other methods can be applied besides directly displaying scores and rankings. That is, a method can be applied of displaying images given a higher score with more priority than those with lower scores (for instance, by displaying images with higher scores larger than other images, or by displaying such images more frequently in a slideshow).

Figure 10A:
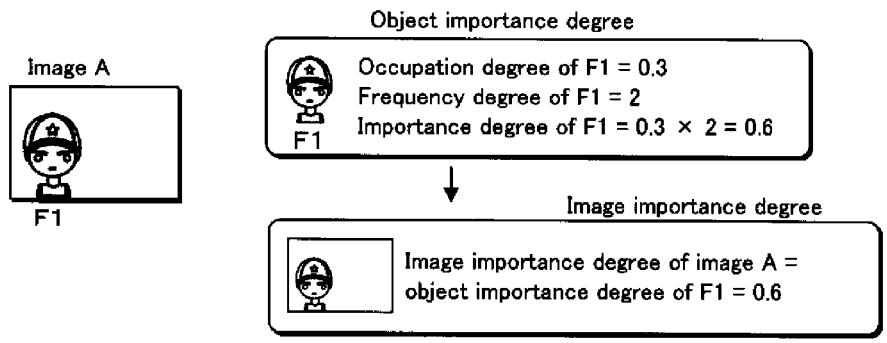
FIGS. 10A through 10C each provide an explanation of object importance degree and image importance degree by referring to a corresponding one of images A through C.
Figure 10B:
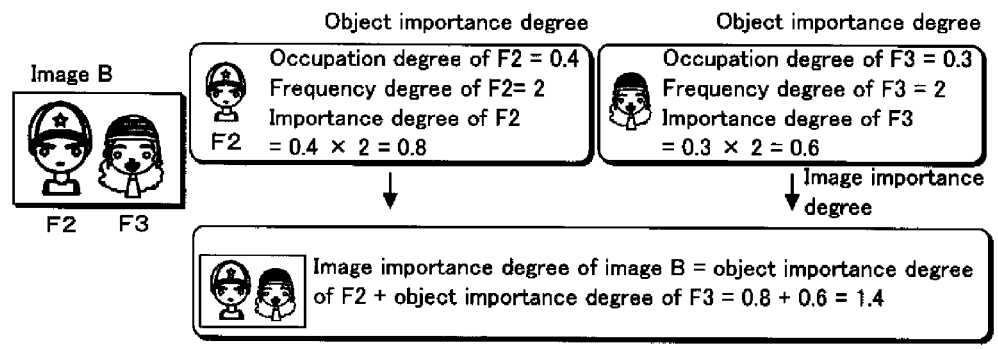
Figure 10C:
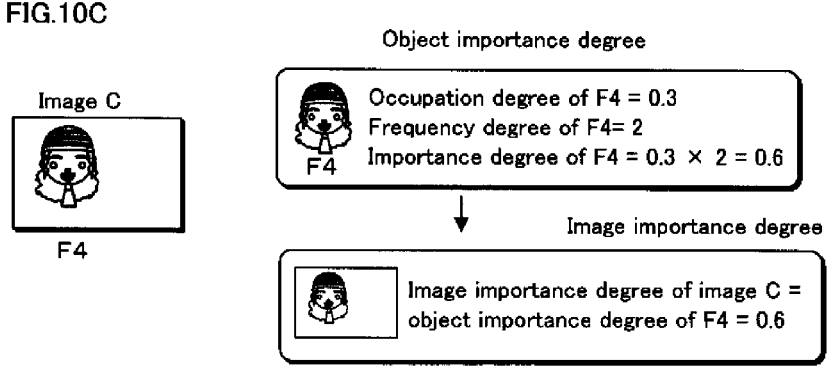

Subsequently, explanation is provided on how an object importance degree and an image importance degree are calculated for each target image, taking images A through C as specific examples, and with reference to the accompanying FIGS. 10A through 10C.

(1) Image A

Image A is an image in which a face F1 object (belonging to the Person a cluster) appears (refer to FIG. 5). The frequency degree of objects belonging to the Person a cluster in the images is 2 (refer to FIG. 7), and the occupation degree of the face F1 in the image A is 0.3 (refer to FIG. 8).

In this case, the object importance degree calculating unit 30 calculates an object importance degree of the face F1 by multiplying the occupation degree 0.3 of the face F1 and the frequency degree 2 of the cluster to which the face 1 belongs. In specific, the object importance degree of the face F1 is calculated as 0.3×2=0.6.

Subsequently, the image importance degree calculating unit 32 sets 0.6, which is the object importance degree of the face F1, as the image importance degree of image A, without any further calculation. This is since the face F1 is the only object included in the image A.

(2) Image B

Image B is an image in which a face F2 object (belonging to the Person a cluster) and a face F3 object (belonging to the Person b cluster) appear (refer to FIG. 5). The frequency degree of the Person a cluster to which the face F2 belongs is 2, and the frequency degree of the Person b cluster to which the face F3 belongs is also 2 (refer to FIG. 7). In addition, the occupation degree of the face F2 in image B is 0.4, while the occupation degree of the face F3 in image B is 0.3 (refer to FIG. 8).

The object importance degree calculating unit 30 calculates an object importance degree for each of the face F2 and the face F3. The object importance degree of the face F2 is calculated as 0.8 (=2×0.4), whereas the object importance degree of the face F3 is calculated as 0.6 (=2×0.3).

Further, since two objects, the face F2 object and the face F3 object appear in the image B, the image importance degree calculating unit 32 adds the object importance degrees of the face F2 and the face F3 to obtain the image importance degree (1.4=0.8+0.6).

(3) Image C

Image C is an image in which a face F4 object (belonging to the Person b cluster) appears. The object importance degree calculating unit 30 calculates the object importance degree 0.6 (=2×0.3) of the image C according to the frequency degree of the Person b cluster and the occupation degree of the face F4 in image C, and sets the object importance degree 0.6 so calculated as the image importance degree of image C, without any further calculation.

Figure 11:
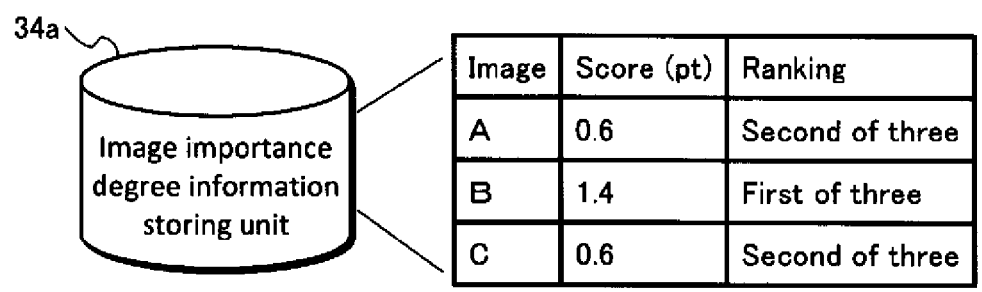
FIG. 11 illustrates a data structure of image importance degree information.

FIG. 11 illustrates an image importance degree information corresponding to the images A through C.

As description has been provided in the above, according to embodiment 1, an image importance degree of an image is calculated according to frequency degrees and occupation degrees of objects included in the image. More specifically, the frequency degrees of the clusters (Person a and Person b) to which the objects in the image belong are calculated according to the result of the clustering performed with respect to objects in the images. Thus, when an object appearing in the images belongs to a cluster having a high frequency degree and/or occupies a comparatively large proportion of the image, the image will be provided with a high image importance degree.

Thus, people occupying a large area in an image and people appearing frequently over a plurality of images are evaluated as being important. Further, ranking of images can be performed without requiring for users to make special operations.

Figure 12A:
FIGS. 12A and 12B each provide an explanation of object importance degree and image importance degree by referring to a corresponding one of images X and Y.

For instance, when a person appears occupying a large area of an image as illustrated in image X in FIG. 12A, image X is provided with a high image importance degree.

Figure 12B:
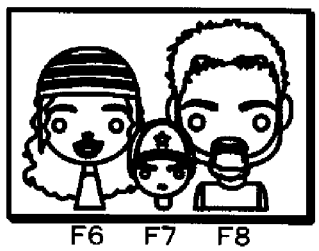
Figure 12B:

Also, when three people appear in a single image as illustrated in image Y in FIG. 12B, the object importance degrees of the three objects are added, providing the image Y with a high image importance degree. For instance, in a case where images owned by a certain family are the evaluation targets, configuration may be made such that the members consisting the family are evaluated as being important objects. As a result, an image in which such important objects appear together (a family photograph) may be granted an especially high evaluation. As such, evaluation of images is performed in such a manner that user intentions and preferences are strongly reflected.

As another example, when considering a case where photos taken in a household are the target images, configuration may be made such that images including such objects as family members and pets and etc., which are often photographed by the user, are evaluated as being important for the user. As such, the present invention has an advantageous effect of facilitating user selection of such images.

Figure 9:
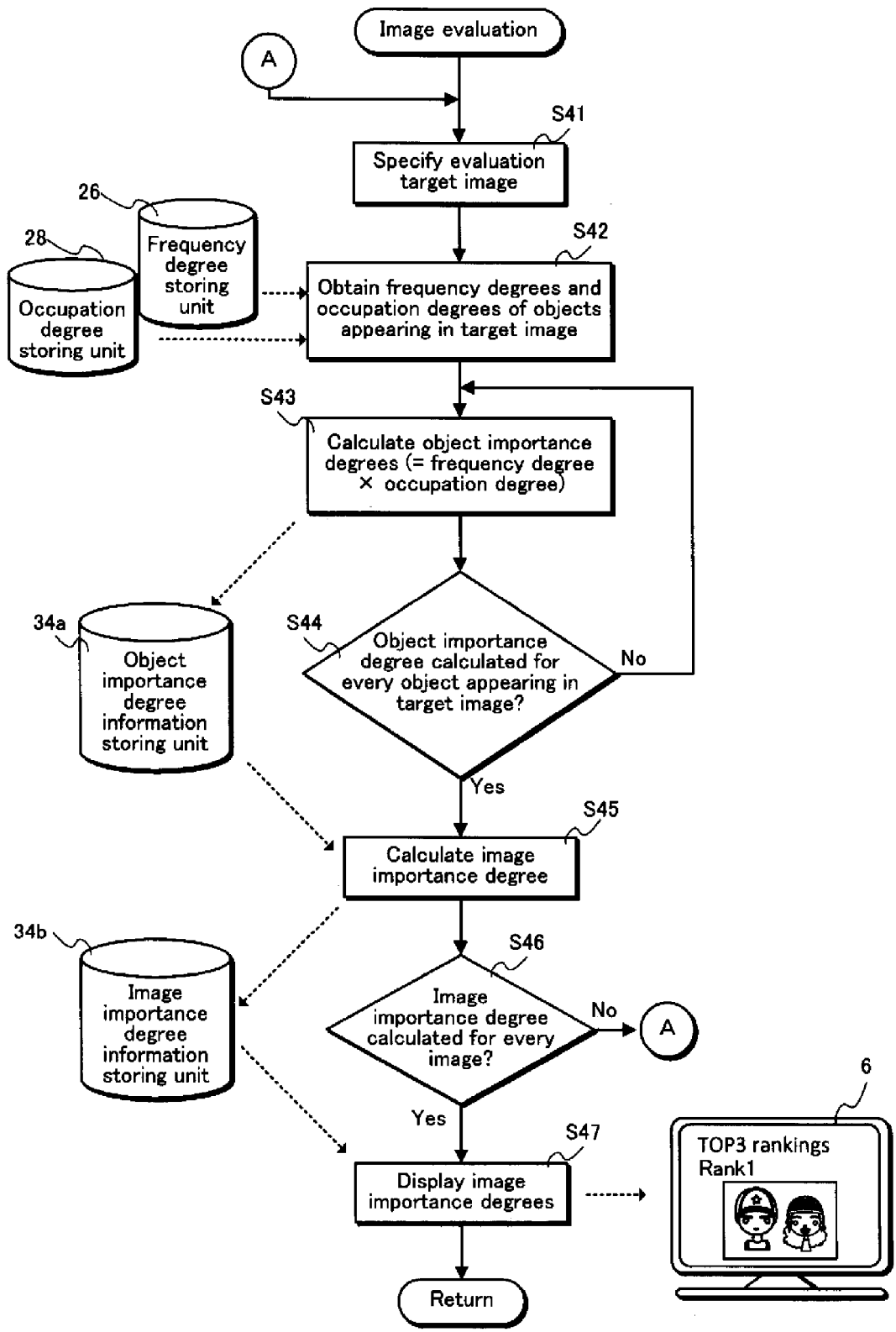
FIG. 9 is a flowchart illustrating details of image evaluation.

Note that, although object importance degree is calculated by multiplying frequency degree and occupation degree in the above-provided example (FIG. 9: S43), the present invention is not limited to this.

For instance, an object importance degree $F_I$ may be calculated by using the following formula.

$$F_1 = \mathrm{Log}(F_R*100+1)/\mathrm{log}(F_N+1)*F_F \quad \text{(Formula 1)}$$

In Formula 1, $F_N$ denotes the number of objects (people) appearing in the image, whereas $F_R$ denotes an occupation degree of the objects in the image.

Further, in the above, the evaluating unit 29 adds up the object importance degrees of multiple objects so as to obtain the image importance degree when there are multiple objects in an image. However, the present invention is not limited to this, and other methods may be used, as long as a higher score is granted to an image in which more objects appear.

For instance, the object importance degrees of the objects in an image may be multiplied in order as to obtain the image importance degree. In such a case, configuration is to be made, such that each of the items for calculation does not fall below 1. This is since, when items with values smaller than 1 are multiplied, the obtained image importance degree decreases, which is problematic. Hence, so as to prevent such a problem, occupation degree may be indicated by using percentage rather than proportion. When such a configuration is made, the object importance degree of the face F2 is calculated as 80 (=40×2), since the occupation degree of the face F2 in image B (refer to FIG. 10 portion (b)) is 40. Similarly, the object importance degree of the face F3 is calculated as 60 (=30×2), since the occupation degree of the face F3 in image B is 30. Accordingly, the evaluating unit 29 performs a calculation of 80×60=4800, so as to obtain the image importance degree of image B.

[Embodiment 2]

In embodiment 2 of the present invention, an image is evaluated by taking into account a link between an object appearing in the image and a cluster to which the object belongs. Furthermore, object importance degrees are calculated such that importance propagates between multiple objects appearing together in a same image. Hence, even if an object does not appear frequently in images or does not occupy a large area in images, a high degree of importance is provided thereto if the object appears in images together with other important objects.

<Structure>

Figure 13:
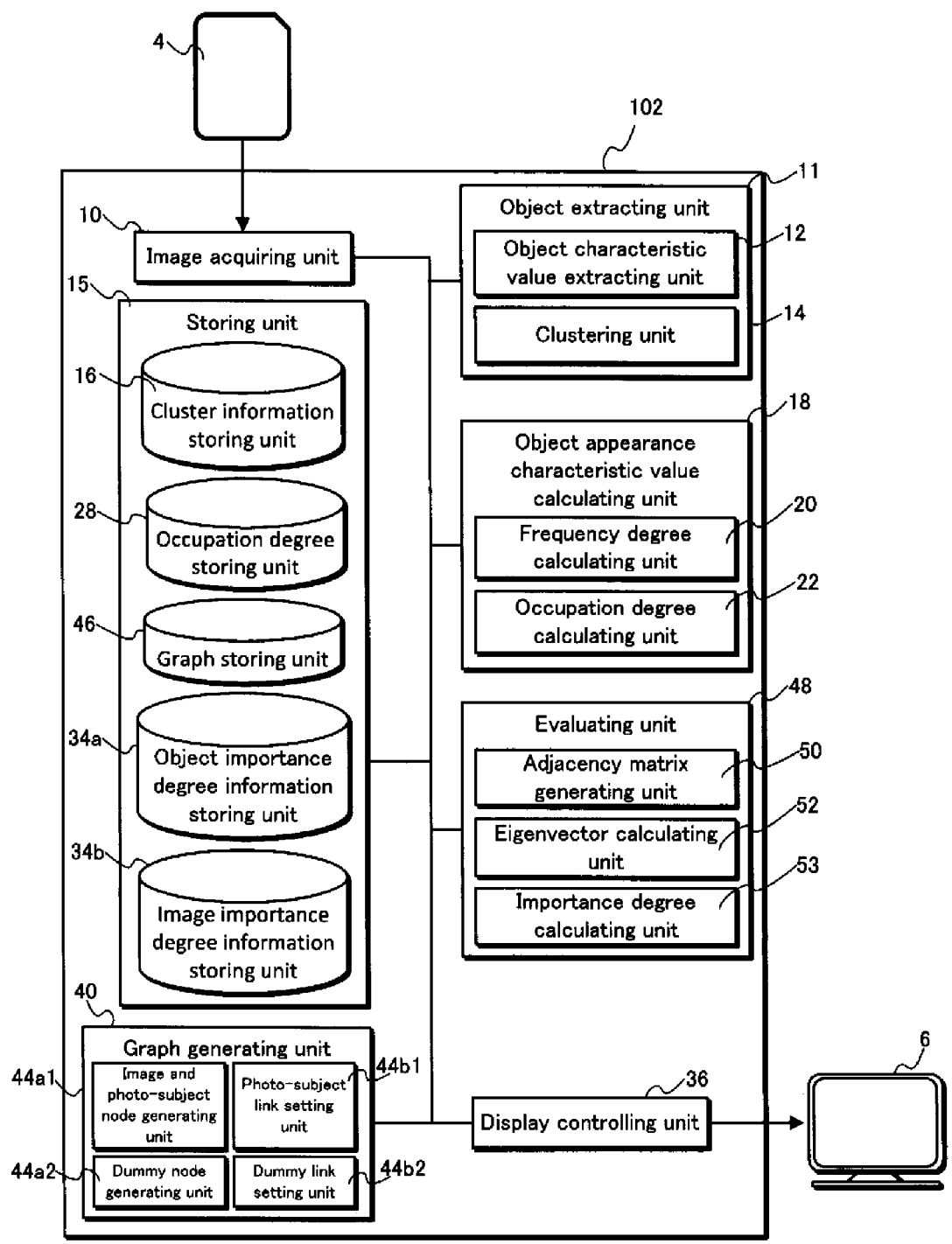
FIG. 13 is a functional block diagram of an image evaluation system 101.

FIG. 13 is a functional block diagram of an image evaluation system 101 pertaining to embodiment 2 of the present invention.

Note that, in FIG. 13, components of the image evaluation system 101 which have been already illustrated in FIG. 1 are indicated by using the same symbols as in FIG. 1, and explanation thereof is omitted.

An image evaluation apparatus 102 of the image evaluation system 101 includes a graph generating unit 40. The graph generating unit 40 includes: an image and photo-subject node generating unit 44a1; a dummy node generating unit 44a2; a photo-subject link setting unit 44b1; and a dummy link setting unit 44b2. The image and photo-subject node generating unit 44a1 and the dummy node generating unit 44a2 generate nodes. The photo-subject link setting unit 44b1 and the dummy link setting unit 44b2 set values of links which indicate connections between nodes.

The image and photo-subject node generating unit 44a1 generates nodes corresponding to images and nodes corresponding to objects. The generation of nodes is performed according to the cluster information (refer to FIG. 5) obtained from the cluster information storing unit 16. The dummy node generating unit 44a2 generates a dummy node (background node).

The photo-subject link setting unit 44b1 sets a link between an image node and an object node, according to the occupation degree of the corresponding object obtained from the occupation degree storing unit 28 and the cluster information of the cluster to which the object belongs obtained from the cluster information storing unit 16. Since the link between an image node and an object node has an orientation, the nodes and the link therebetween constitute a directed graph.

The dummy link setting unit 44b2 similarly sets a link between an image node and a dummy node.

A graph storing unit 46 of the storing unit 15 stores a graph generated by the graph generating unit 40.

An evaluating unit 48 includes: an adjacency matrix generating unit 50; an eigenvector calculating unit 52; and an importance degree calculating unit 53.

The adjacency matrix generating unit 50 generates an adjacency matrix representing the graph stored in the graph storing unit 46.

The eigenvector calculating unit 52 calculates an eigenvector of the adjacency matrix so generated.

Further, the importance degree calculating unit 53 calculates an object importance degree for each of the objects and an image importance degree for each of the images, according to the vector components of the eigenvector so calculated.

The object importance degrees which have been so calculated are stored to the object importance degree information storing unit 34a. In addition, the image importance degrees which have been so calculated are stored to the image importance degree information storing unit 34b.

<Operation>

Explanation is provided in the following on the processing taking place up to a point where evaluation of an image is completed.

Figure 14:
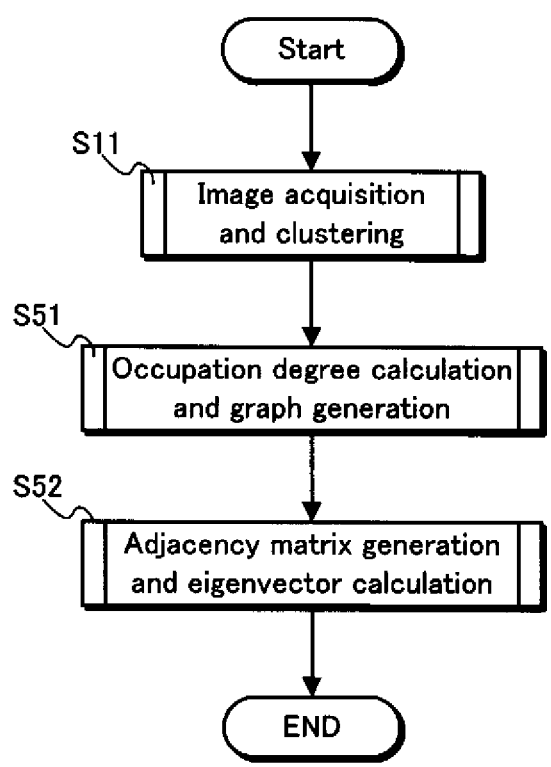
FIG. 14 is a flowchart illustrating an overview of image evaluation.

As is illustrated in FIG. 14, processing is executed in the order of (i) image acquisition and clustering (S11), (ii) occupation degree calculation and graph generation (S51), and (iii) adjacency matrix generation and eigenvector calculation (S52).

Explanation of details of the image acquisition and clustering is omitted in the following, since the processing is similar to that explained in embodiment 1 with reverence to FIG. 3.

Figure 15:
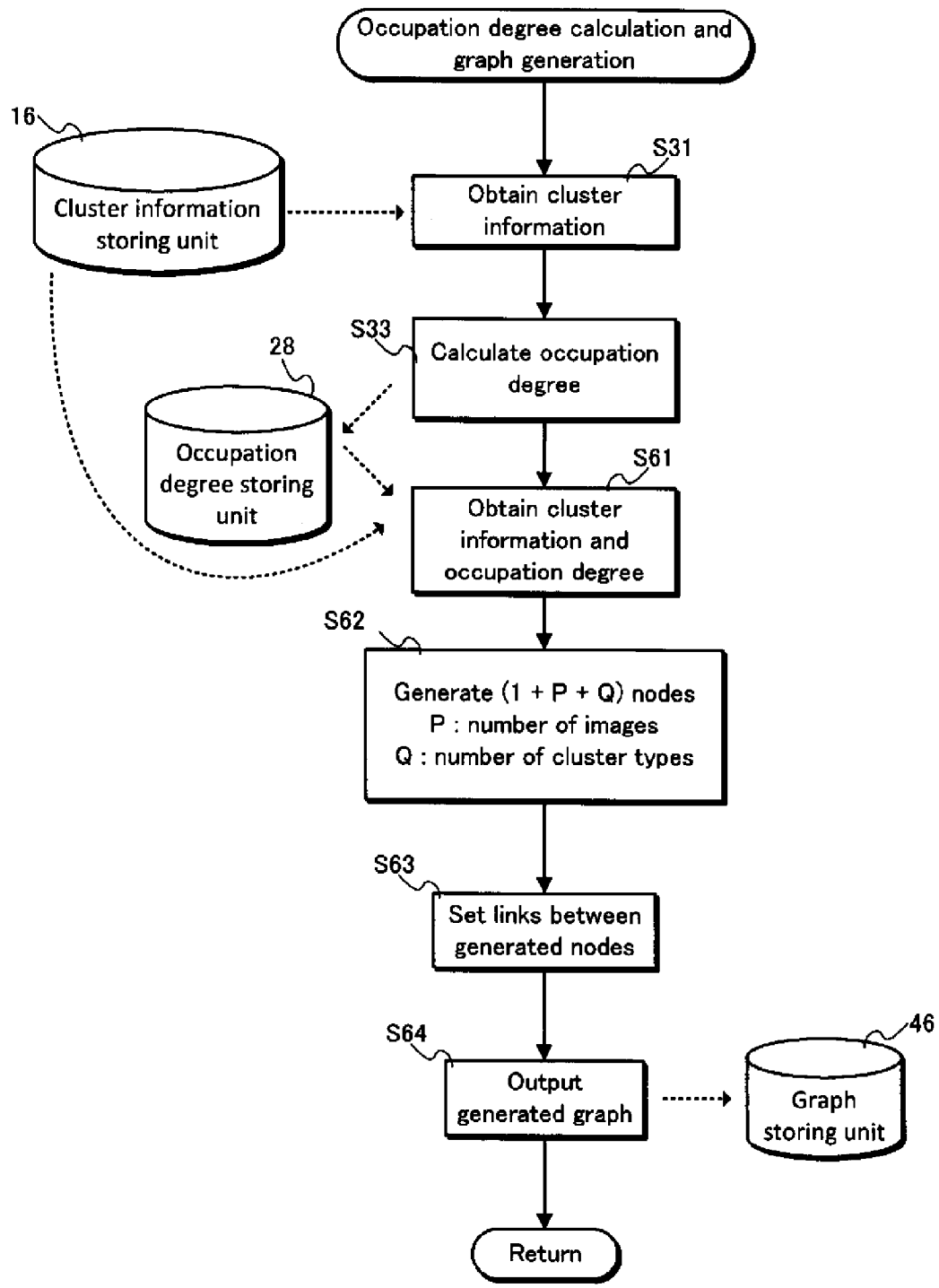
FIG. 15 is a flowchart illustrating details of occupation degree calculation and graph generation.

As is illustrated in FIG. 15, in the occupation degree calculation and graph generation, the occupation degree calculating unit 22 obtains cluster information from the cluster information storing unit 16 (S31), and calculates an occupation degree indicating a proportion of a surface area of an image that is occupied by a certain person (S33). Since the calculation of occupation degree is performed in the same way as explained in embodiment 1 (refer to FIG. 6), explanation thereof is omitted and the steps thereof are labeled by using the same numbers.

The image and photo-subject node generating unit 44a1 and the dummy node generating unit 44a2 of the graph generating unit 40 each obtain cluster information from the cluster information storing unit 16 and occupation degree from the occupation degree storing unit 28 (S61).

Subsequently, the image and photo-subject node generating unit 44a1 generates P nodes corresponding to the images (the number of images being P in this case) included in the cluster information. Similarly, the image and photo-subject node generating unit 44a1 also generates Q nodes corresponding to the types of clusters (the number of types of clusters being Q in this case). On the other hand, the dummy node generating unit 44a2 generates one node which corresponds to the background (one abstract dummy node Z corresponds to backgrounds of all of the images). Thus, the total number of nodes generated is (1+P+Q) (S62).

In the case of the cluster information illustrated in FIG. 5, since there are three images, images A through C, the number of image nodes P=3. On the other hand, since there are two cluster types, the person A cluster and the person b cluster, the number of cluster nodes Q=2. Hence, a total of (1+3+2)=6 nodes are generated.

Note that here, for obtaining the number of images and number of cluster types, the number of images shown in images 27b and the cluster types shown in cluster name 27a, which are calculated by the frequency degree calculating unit 20 (FIG. 7), may be respectively used.

Further, in the following, images A and B are set as target images, while image C is excluded from the group of target images for the sake of facilitating explanation. A total of five nodes are generated in such a case, since the number of images decreases by one.

Subsequently, the photo-subject link setting unit 44b1 and the dummy link setting unit 44b2 of the graph generating unit 40 set links between the nodes so generated (S63). The basic rules applied when setting the links are as follows.

(1) A value of a link directed from an image node to a cluster node is set to an occupation degree of an object that appears in the image corresponding to the image node and that belongs to a cluster of the cluster node.

(2) A value of a link directed from a cluster node to an image node is set to a predetermined fixed number.

(3) A value of a link directed from an image node to the dummy node Z is set to an occupation degree of the background.

(4) A value of a link directed from a cluster node to the dummy node Z is set to a value obtained by calculating "1-the fixed number of (2)".

(5) A value of a link directed from the dummy node Z to each of a cluster node and an image node is set to a number obtained by dividing "1" by the total number of nodes which are linked with the dummy node Z (equal distribution of "1" among nodes).

(6) Values of links other than those which are described above are set to "0".

Figure 16:
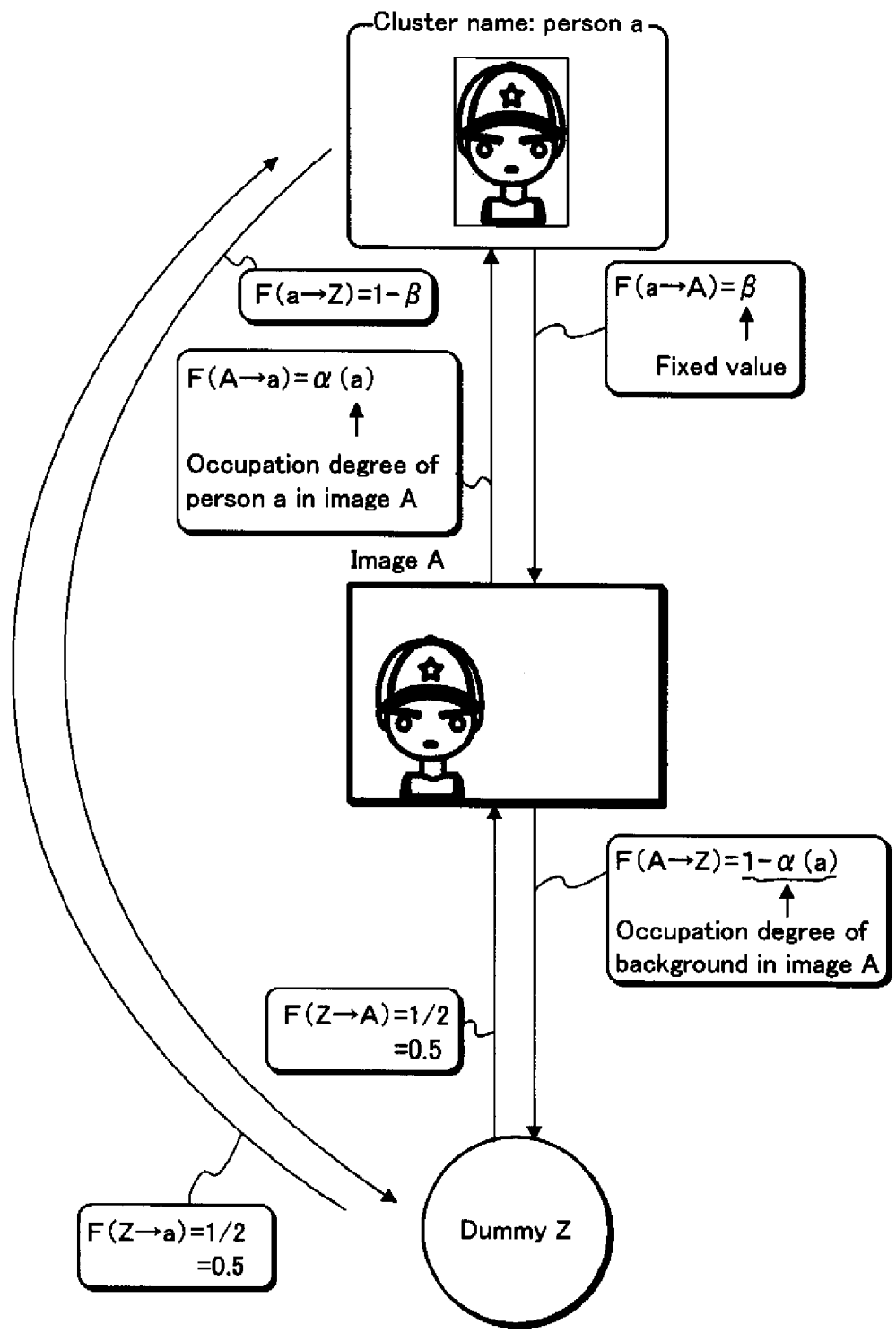
FIG. 16 provides an explanation of an example where links are set between image A, person a, and dummy Z.

FIG. 16 illustrates an example of setting links between image node A corresponding to the image A, cluster node a corresponding to the person a cluster, and the dummy node Z corresponding to the dummy Z.

When links are set between the nodes according to the rules (1) through (6) above, the value of the link directed from the image A to the person a (F(A→a)) is the occupation degree $\alpha(a)$ of person a in image A. Contrariwise, the value of the link directed from the person a to the image A (F(a→A)) is a fixed value $\beta$.

Further, the value of the link directed from the image A to dummy Z (F(A→Z)) is the occupation degree (1−$\alpha(a)$) of the background in image A. Also, the value of the link directed from the person a to the dummy Z (F(a→Z)) is 1−$\beta$.

Finally, the value of the link directed from dummy Z to image A (F(Z→A)) and the value of the link directed from the dummy Z to person a (F(Z→a)) is commonly 0.5, which is obtained by dividing 1 by 2, which is the total number of nodes which are linked with the dummy Z.

Figure 17:
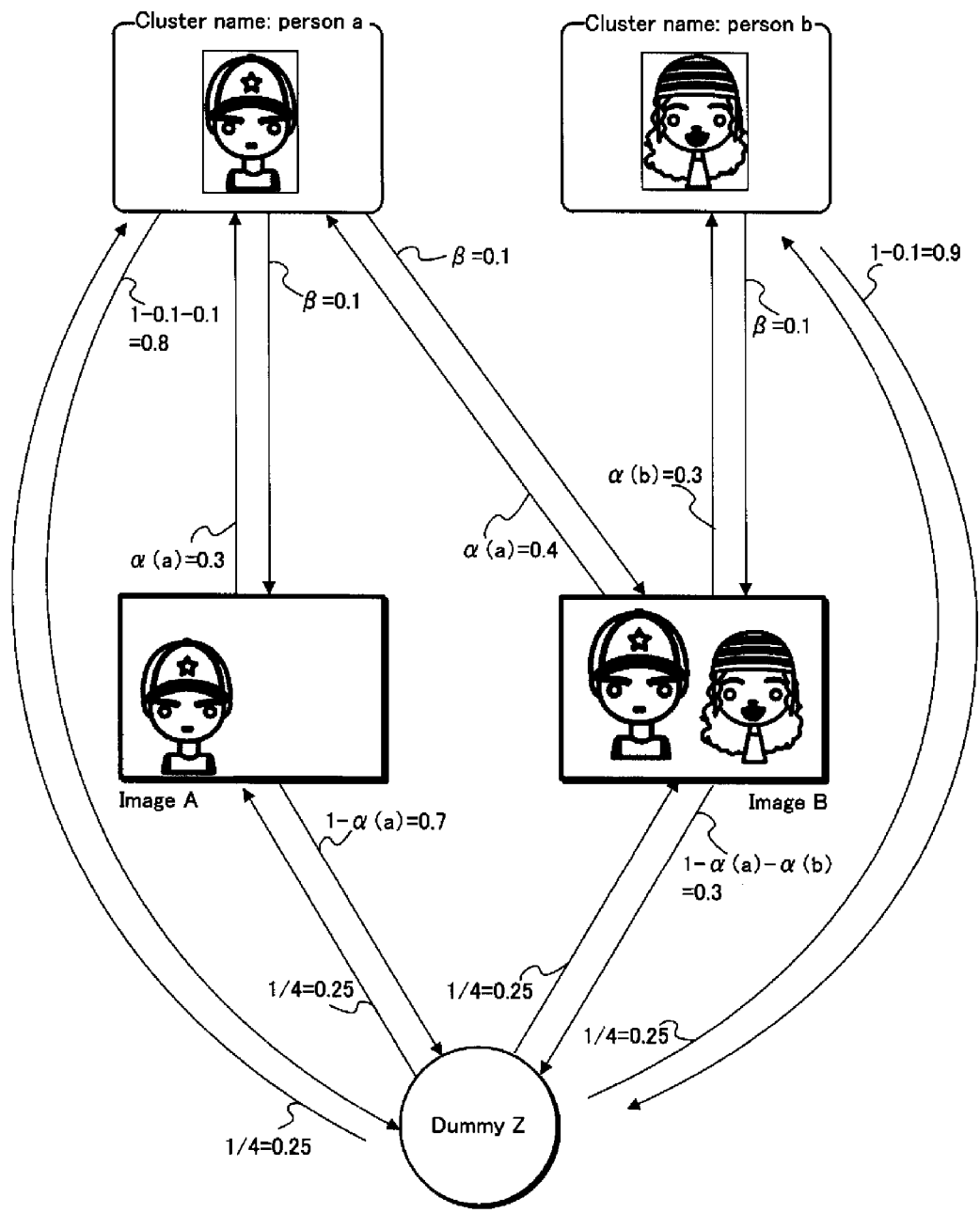
FIG. 17 provides an explanation of setting of links between five nodes, which are images A and B, persons a and b, and dummy Z.

FIG. 17 illustrates the setting of links according to the rules as provided in the above.

As illustrated in FIG. 17, the value of the link directed from the image A to the person a is 0.3, which is the occupation degree of the person a in the image A. On the other hand, the fixed value $\beta$ of the link directed from the person a to the image A is 0.1. This is since $\beta$ is set to the value 0.1 in this case.

Further, the value of the link directed from the image A to the dummy Z is 0.7, since the occupation degree of the background in the image A is 0.7. Additionally, the value of the link directed from the dummy Z to each of the four other nodes linked therewith is commonly 0.25, which is obtained by dividing 1 by 4, which is the total number of nodes linked with the dummy Z. Similarly, values are set to links between other nodes according to the rules as provided in the above.

When the setting of nodes and links between nodes is completed, the graph generating unit 40 outputs a graph (S64). Subsequently, the graph storing unit 46 first converts the graph output from the graph generating unit 40 into a table, and stores the table therein. For instance, the graph illustrated in FIG. 17 is stored as a table illustrated in FIG. 18.

Figure 19:
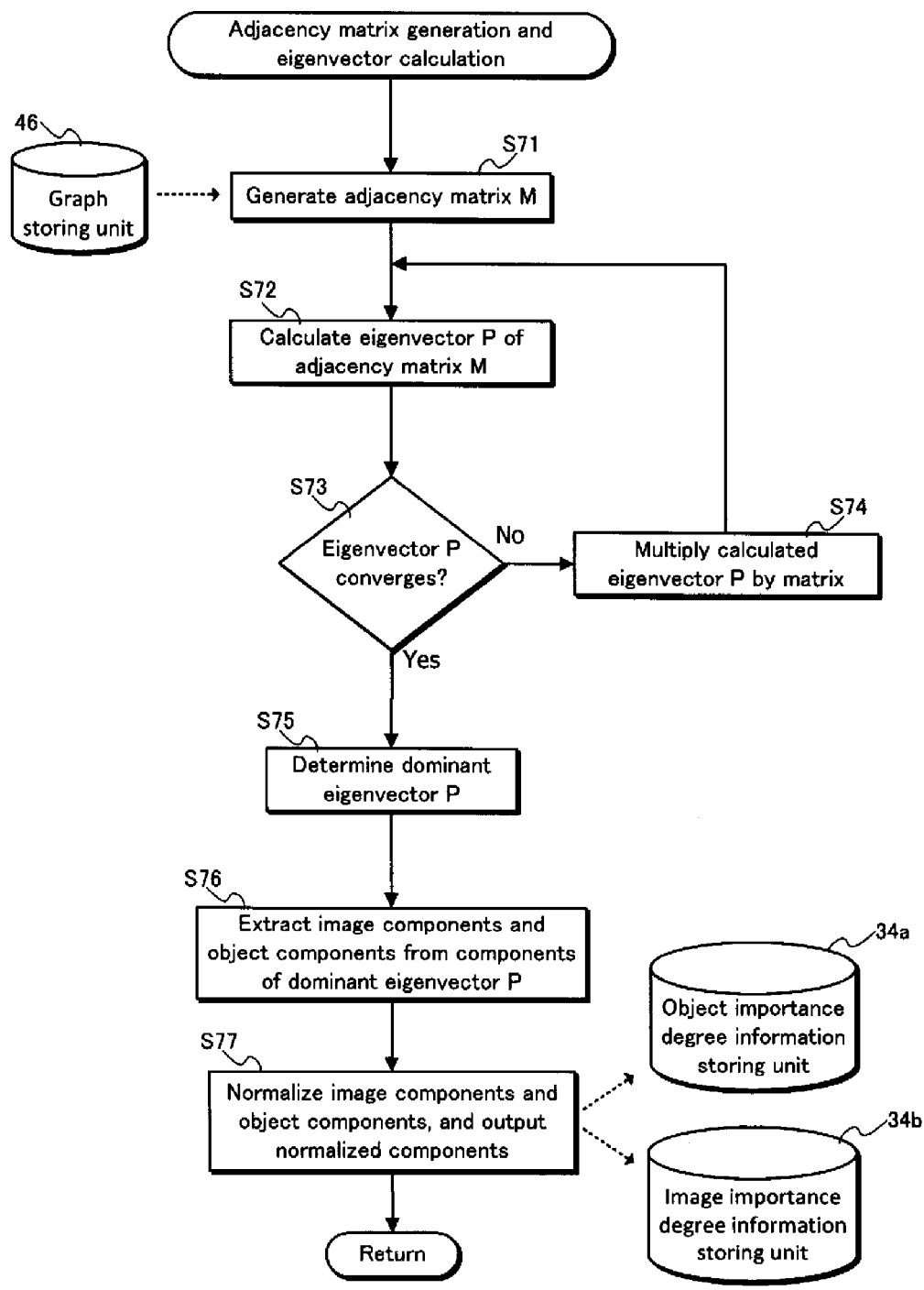
FIG. 19 is a flowchart illustrating adjacency matrix generation and image evaluation.

Subsequently, explanation is provided on the details of the adjacency matrix generation and image evaluation, with reference to FIG. 19.

As for the method for evaluating elements according to an adjacency matrix, the method as disclosed in the Referenced Document 2, which is provided in the following, may be applied.

Figure 18:
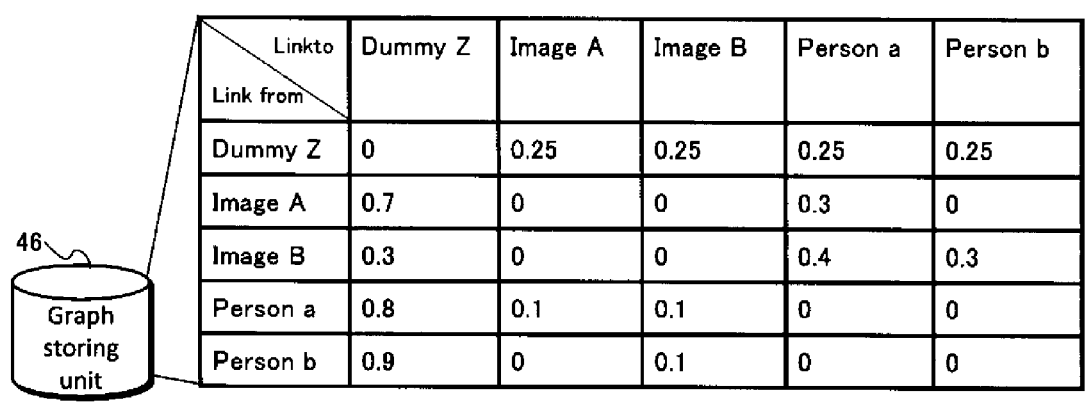
FIG. 18 is a diagram illustrating a table structure of a graph.

Firstly, the adjacency matrix generating unit 50 generates an adjacency matrix M by using the table stored in the graph storing unit 46 (S71). When, for instance, the table illustrated in FIG. 18 is stored in the graph storing unit 46, an adjacency matrix M as illustrated in FIG. 20 is generated. The adjacency matrix M illustrated in FIG. 20 is a five×five square matrix (five rows×five columns).

Subsequently, the eigenvector calculation unit 52 calculates an eigenvector of the adjacency matrix M. The processing performed in Steps S72 through S74 in FIG. 19 is, in specific, a power method operation. The power method is one method for simultaneously obtaining both a dominant eigenvalue and a dominant eigenvector belonging to the dominant eigenvalue.

That is, by using the following formula:

$$MP = \lambda P \quad \text{(Formula 2)},$$

an eigenvector P satisfying the adjacency matrix M when $\lambda$ is a fixed number can be obtained (S72). When the eigenvector P does not converge (S73: No), the original matrix is multiplied to the eigenvector P obtained (S74). The calculation in S74 is recursively and iteratively performed until the eigenvector P of the matrix finally converges (S73: Yes).

Subsequently, the eigenvector calculation unit 52 determines, as the dominant eigenvector P, the converged eigenvector P (S75). The importance degree calculation unit 53 extracts, from the components of the dominant eigenvector P, image components and object components (S76).

Finally, the importance degree calculation unit 53 normalizes each of the image components and the object components (normalization is performed such that the total of each of the components equals "1"), and outputs the normalized components to the image importance degree information storing unit 34b (S77).

Figure 21:
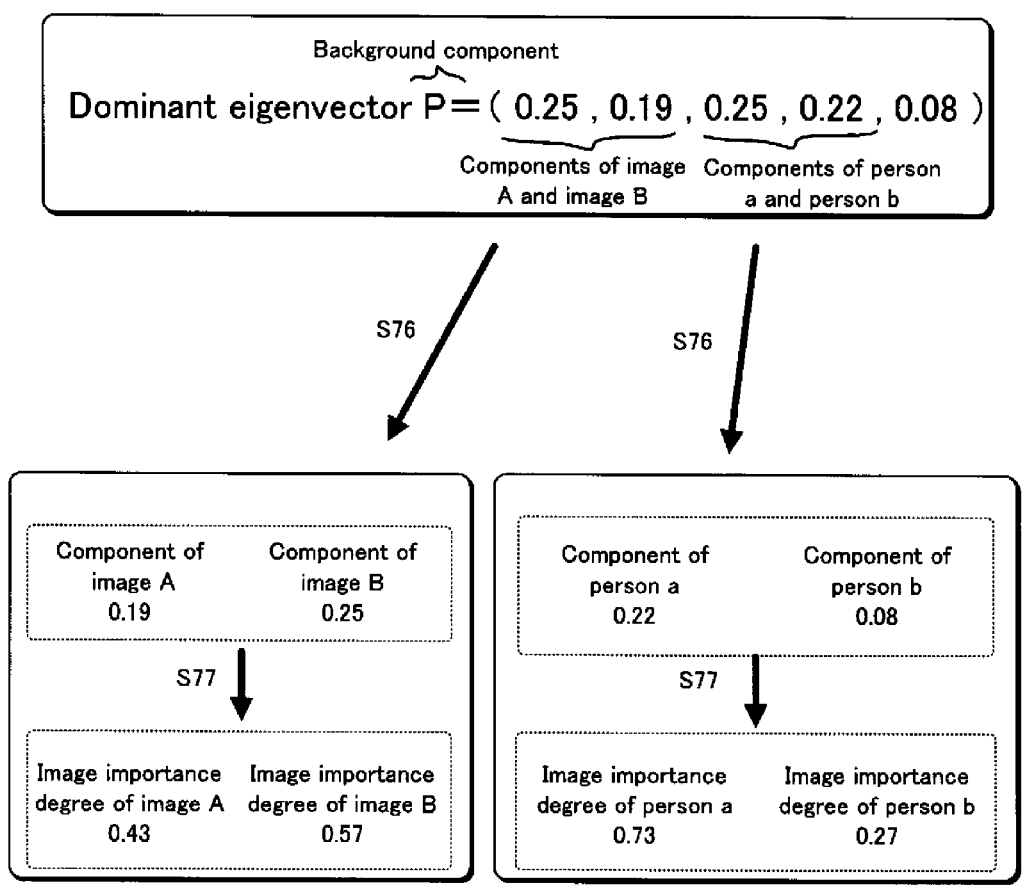
FIG. 21 provides an explanation of a flow of processing when obtaining image importance degree and object importance degree from components of a dominant eigenvector P.

In the following, detailed explanation is provided on the processing in Steps S76 and S77. FIG. 21 illustrates how processing flows when obtaining image importance degrees and object importance degrees from components of the dominant eigenvector P.

As illustrated in FIG. 21, the image importance degrees of images A and B and the importance degrees of persons a and b can be relatively evaluated by (i) extracting the components corresponding to images A and B and the components corresponding to persons a and b from the dominant eigenvector P=(0.25, 0.19, 0.25, 0.22, 0.08), and (ii) performing normalization of the extracted components.

As description has been provided in the above, according to embodiment 2, an object occupying a large portion in the images and/or appearing frequently in the images is evaluated as being important, and further a high score is provided to images in which such an important object appears. Such effects are similar to those of embodiment 1 of the present invention.

Further, by recursively calculating the eigenvector of the adjacency matrix M, which indicates links set between nodes, importance propagates from one object to another. Hence, objects which do not appear frequently in the images or do not appear occupying a large portion of an image can be provided with a high importance degree when appearing together in images with important objects.

Figure 22A:
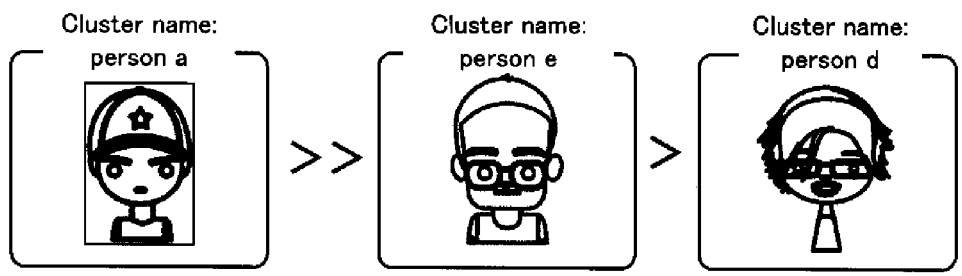
FIGS. 22A through 22C provide an explanation of propagation of importance between objects.

In the following, explanation is provided on the propagation of importance between objects by referring to an example illustrated in FIGS. 22A through 22C. The frequency degrees of the 3 clusters, person a (son), person d (son's grandmother), and person e (son's friend) fulfill the relation person a>person e>person d (FIG. 22A). As such, person a has a high frequency degree, and objects belonging to the person a cluster appear very frequently in the images (which indicates that person a is very important).

Figure 22B:
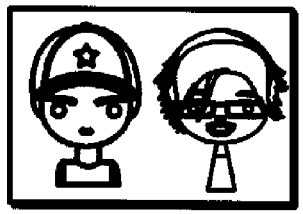

In such a case, when an image, such as illustrated as image D in FIG. 22B, in which two objects (faces) respectively belonging to the person a cluster and the person d cluster appear together is included among the target images, the importance degree of person d is increased, by being influenced by the high importance degree of person a. Therefore, when comparing an image E where person d appears alone and an image F where person e similarly appears alone, the image E where person d appears alone can be evaluated as having a higher image importance degree than the image F, even though person d has a lower frequency degree compared to person e.

Figure 22C:
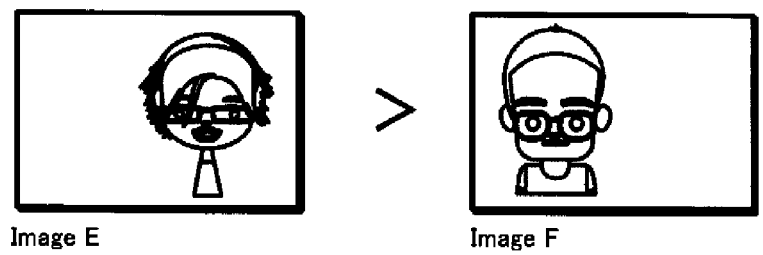

Hence, in the example illustrated in FIGS. 22A through 22C, the importance in the images of the grandmother, who does not appear in a large number of images, can be increased by appropriately utilizing the co-appearance of objects in the images.

[Embodiment 3]

In embodiment 2 above, calculation of image importance degrees and object importance degrees is performed by utilizing the data structure formed between the images and the objects included (appearing) in the images. Generally, the data structure to be utilized in such a calculation can be any structure, provided that definition is provided of a set of images, a set of elements related to the images, and a relation between the two sets.

The elements related to the images may be objects included in the images, as description has been made in embodiment 2. However, the present invention is not limited to this, and the elements related to the images may be various forms of information which are embedded to the images, as specified in the Exif (Exchangeable image file format). Furthermore, the elements related to the images may be tags provided to the images.

In embodiment 3 of the present invention, description is made on a data structure between images and tags provided to the images, as one example of a data structure which can be utilized for the calculation of image importance degrees.

Figure 25:
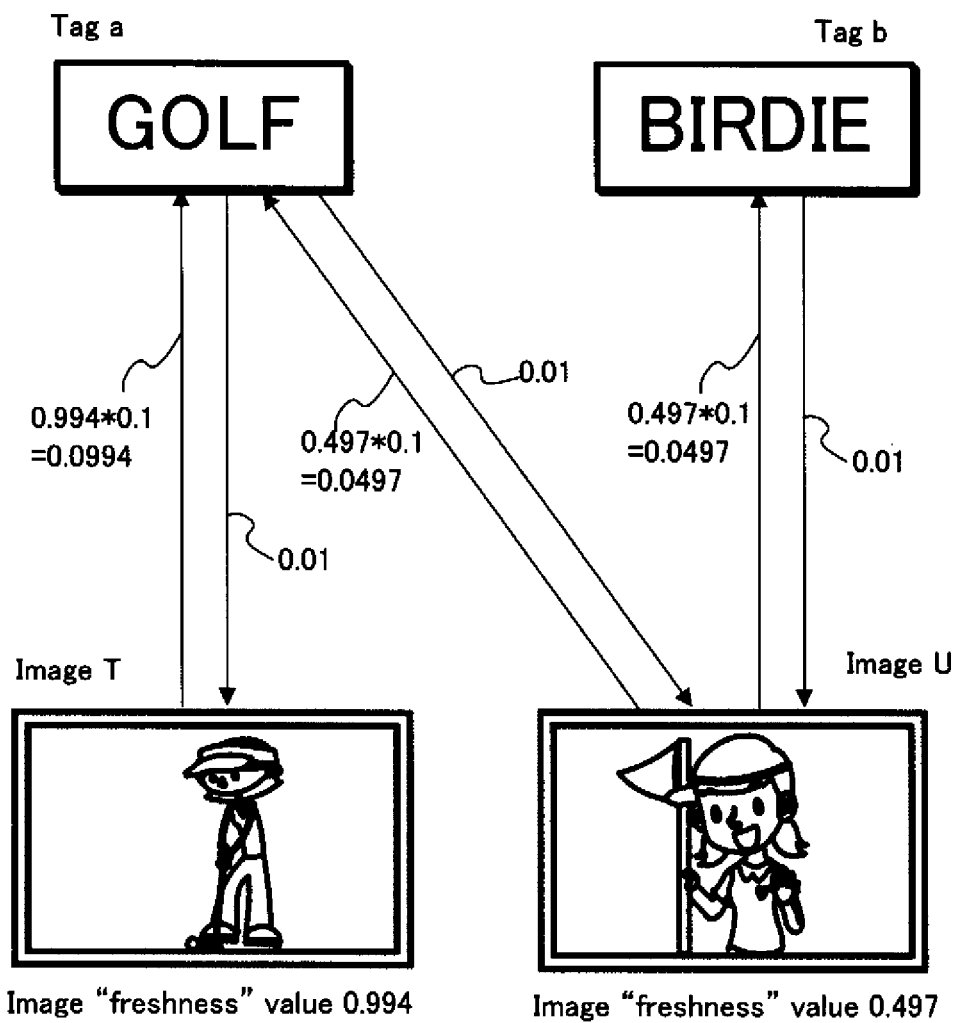
FIG. 25 provides an explanation of a relationship between images (image T and image U) and tags (tag a and tag b).

FIG. 25 illustrates relations between images (image T and image U) and tags (tag a and tag b).

A "GOLF" tag a is provided to image T, while a "BIRDIE" tag b is provided to image U in addition to the "GOLF" tag a.

Here, it is presumed that such tags have been set through manual operations by a user, for example.

In FIG. 25, links indicating relations between the images T and U and the tags a and b are also illustrated.

First, explanation is provided of the values of links directed from the images to the tags.

The value of a link directed from an image to a tag is calculated by multiplying a value indicating "freshness" of an image by $\frac{1}{10}$.

Here, the value indicating "freshness" of an image can be obtained by calculating the difference between the present date and time (date and time of evaluation) and the date and time at which the image was added to the user's collection.

For instance, when presuming that image T was added 30 days prior to the date of evaluation and image U was added 360 days prior to the evaluation, more weight is provided to the links between image T and each of the tags a and b than to the links between image U and each of the tags a and b.

More specifically, the "freshness" of an image is a normalized value (0-1) of the date and time at which the image was added. The actual calculation of the "freshness" of an image can be performed by using the following formula.

Freshness of image $T$=(date and time when image $T$ was added–date and time when the oldest among images was added)/(present date and time–date and time when oldest among images was added)

Here, the difference between dates and times is calculated in units of minutes.

For instance, if presuming that the freshness of image T is 0.994, the value of the link from image T to the "GOLF" tag a is calculated as 0.994×0.1=0.0994

Subsequently, explanation is provided on the links directed from the tags to the images.

A fixed value is assigned to the links directed from the tags to the images. The fixed value can be, for instance, 0.01.

In such a case, the value of the link directed from the "GOLF" tag a to the image T is 0.01.

As such, by obtaining each of the images T and U and each of the tags a and b, by obtaining the relationship between the images T and U and the tags a and b, and further, by utilizing an adjacency matrix as description has been made in embodiment 2, the image importance degrees of the images T and U and the tag importance degrees of the tags a and b can be calculated.

In addition, such calculations as described in the present embodiment may be utilized to create a ranking of images on a web server. Further, such a ranking may be created to reflect trends concerning such images.

Figure 26:
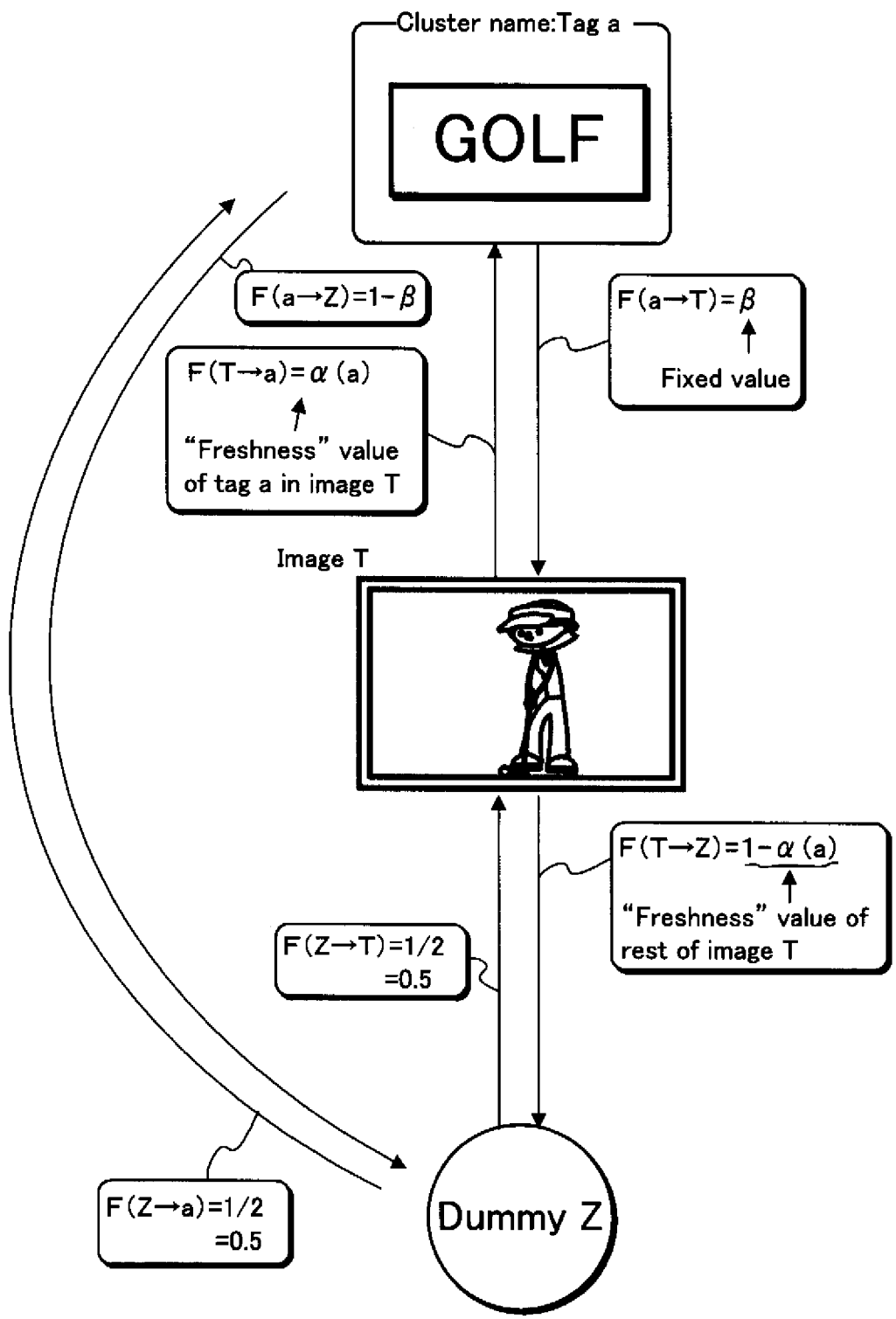
FIG. 26 provides an explanation of a relationship between image T, tag a, and dummy Z.

Further, as illustrated in FIG. 26, configuration may be made such that a dummy node is additionally created and links are set between the dummy node and other nodes such that weights are returned to the dummy node from tags and images.

<Supplement>

Although description has been made in the above on embodiments of the present invention, it is to be understood that the present invention is not limited thereto. The present invention is applicable in various embodiments and modifications which do not depart from the spirit and scope thereof and which are for achieving the above mentioned aim of the present invention or other aims related or associated thereto.

(1) Concerning "Clustering"

In the above embodiments, the k-means method, which is a non-hierarchical clustering method, is applied as the method of clustering adopted in the clustering performed by the clustering unit 14. However, the present invention is not limited to this, and a hierarchical clustering method such as the Ward's method may be applied.

(2) Concerning "Objects"

Description has been provided in the embodiments taking people's faces as an example of an object. However, the present invention is not limited to this, and faces of animals such as dogs and cats may be set as target objects from which image characteristic values are extracted. In addition, the objects appearing in the images are not limited to faces, and may be various other objects such as cars, plants, buildings, and etc.

(3) Concerning "Method for Calculating Eigenvectors"

In embodiment 2, the eigenvector calculation unit 52 calculated eigenvectors by applying the power method. However, the present invention is not limited to this. For instance, the inverse iteration method may be applied in the calculation of eigenvectors.

(4) Concerning "Fixed Value β"

In embodiment 2, the value of the links directed to the images A and B is set to a fixed value $\beta(=0.1)$ (refer to FIG. 17), but the present invention is not limited to this. That is, the value of the fixed value β may be set as appropriate. In addition, the fixed values of links directed to images may be set separately for each of the images, such that a link directed from the person a to the image A is provided with a fixed value $\beta 1$, whereas a link directed from the dummy Z to the image A is provided with a fixed value $\beta 2$.

In addition, the links directed to the images A and B may be determined utilizing the countermeasure against the problem of rank sink. The problem of rank sink, which is described in Referenced Document 2 below, is a problem where importance degrees are accumulated by nodes and never distributed due to there being no outward-directed links.

(5) Concerning "Background Node"

In embodiment 2, description is provided on an example where a graph is generated by setting a single node (dummy Z) which represents the background images of all the images. However, the present invention is not limited to this, and alternatively, a plurality of background nodes may be generated, or a graph not having any background nodes may be generated.

(6) Concerning "Object Importance Degree"

In the embodiments, description is made of examples where object importance degrees are calculated according to (A) the frequency degree of the cluster to which a corresponding object belongs, and (B) the occupation degree of the corresponding object in a corresponding image.

However, (A) may be any amount which characterizes the cluster to which the object belongs, and need not be the frequency degree (i.e. the number of members in the cluster).

Further, concerning (B), the weight of the object may be determined according to a smile degree of a person who is the object in the corresponding image, an orientation of the person's face in the image, or a degree of focus of the person in the image, in addition to the occupation degree.

Figure 23:
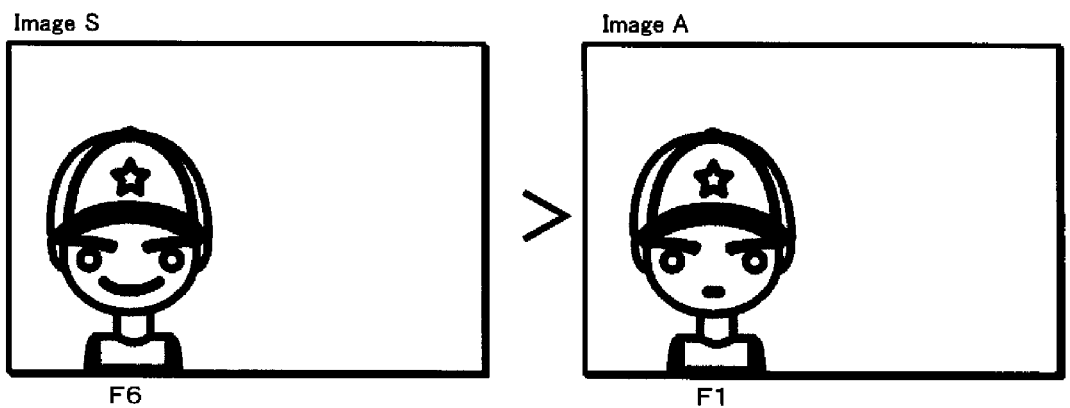
FIG. 23 provides an explanation of calculation of object importance degree where a smile degree is used for the calculation.

FIG. 23 illustrates an example where a smile degree of the person in an image is taken into consideration. As illustrated in FIG. 23, the importance degree of each of the objects (F1, F6) may be calculated by using a coefficient indicating a smile degree of the person. Further, in such a case, the image S in which the person exhibits a higher smile degree is evaluated as having a higher image importance degree compared with image A where the person exhibits a lower smile degree.

In addition, when calculating an image importance degree by additionally using the orientation of a person's face in the image, a calculation formula may be used where the more the person's face is facing the front in the image, the higher the image importance degree provided to the image is.

When calculating an object importance degree according to the degree of focus of the person in the image, for instance, a high evaluation is provided when the person appears sharply in the image, whereas a low evaluation is provided when the person appears blurred in the image. For such an evaluation based on the degree of focus, the technology disclosed in Referenced Document 3 below may be applied.

Further, object importance degrees of objects may be calculated while not using occupation degree as a factor at all, and by using other factors such as the smile degree of a person who is the object, the orientation of the person's face, and the degree of focus of the person.

In short, as long as the value used for the calculation of the object importance degree is a value indicating a characteristic of the appearance of the object in a corresponding image, various values may be used such as and not limited to the occupation degree, the smile degree, and the orientation of face.

(7) Concerning "Extraction of Objects and Clustering"

In the embodiments above, the image evaluation apparatus 2 includes therein the object characteristic value extracting unit 12 and the clustering unit 14. However, such units may provided externally with respect to the image evaluation apparatus 2.

Figure 24:
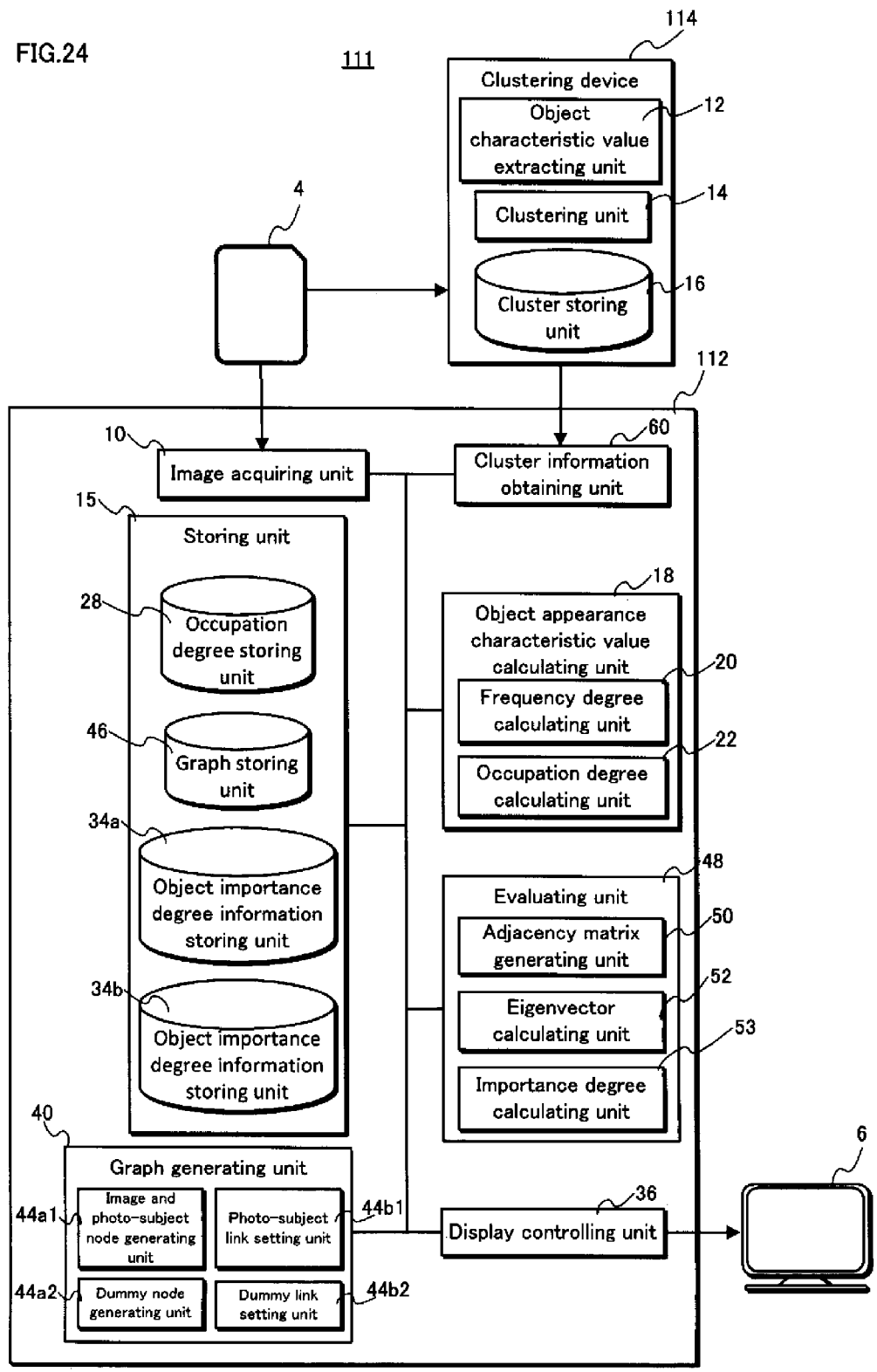
FIG. 24 is a functional block diagram of an image evaluation system 111.

An image evaluation system 111 illustrated in FIG. 24 includes: an image evaluation apparatus 112; the SD memory card 4, and a clustering device 114. The clustering device 114 includes: the object characteristic value extracting unit 12; the clustering unit 14; and a cluster storing unit 16. The object characteristic value extracting unit 12 extracts an object characteristic value from image data obtained from the SD memory card 4. The image evaluation apparatus 112 includes a cluster information obtaining unit 60 for obtaining cluster information stored in the cluster storing unit 16.

(8) Concerning "Storage Entity of Images"

In the embodiments, description has been made that evaluation target images are stored in the SD memory card 4. However, the present invention is not limited to this, and evaluation target images may be stored in any recording medium, including: a Smart Media; a Compact Flash™; a Memory Stick™; an SD memory card; a multimedia card; a CD-R/RW; a DVD±R/RW; a DVD-RAM; an HD-DVD; and a BD (Blu-ray Disc).

In addition, images may be obtained by connecting the image evaluation apparatus to a photography device storing images, such as a digital camera and a mobile phone. The connection between the image evaluation apparatus and such devices may be wired connections (a LAN cable, a USB cable, and etc.) or wireless connections (an infrared connection, a Bluetooth connection, and etc.), and various types of connections may be used.

(9) Integrated Circuit

The image evaluation apparatus pertaining to the embodiments of the present invention may be typically implemented as an LSI (Large Scale Integration), which is a type of integrated circuit. Further, each of the circuits may be separately integrated into a single chip, or the functions may be integrated into a single chip including a part or all of the circuits. Although description has been made on the basis of an LSI in the above, the name of the integrated circuit may differ according to the degree of integration of the chips. Other integrated circuits include an IC (integrated circuit), a system LSI, a super LSI, and an ultra LSI. Further, the method applied for forming integrated circuits is not limited to the LSI, and the present invention may be realized on a dedicated circuit or a general purpose processor. For example, the present invention may be realized on a FPGA (Field Programmable Gate Array) being an LSI which can be programmed after manufacturing, or a reconfigurable processor being a LSI, reconfiguration of which could be made to the connection of internal circuit cells and settings.

Further in addition, if a new technology of circuit integration emerges as a result of the progress made in the field of semiconductor technology or another technology deriving therefrom, the integration of function blocks may be performed applying such technology. At this point, there is a possibility of biotechnology being applied to induce the future development of circuit integration technology.

(10) Program

It may be conceived to distribute a control program composed of program code for causing processors of various apparatuses including computers and various circuits connected to the processors to execute the image evaluation processing (refer to FIGS. 2, 3, 6, 9, 14, 15, and 19) described in the embodiments. The distribution of such control program may be realized by recording the control program onto recording media, or transmitting the control program via various communication paths.

The recording media which may be used in the distribution of the control program include such recording media as: a Smart Media; a Compact Flash™; a Memory Stick™; an SD memory card; a multimedia card; a CD-R/RW; a DVD±R/RW; a DVD-RAM; an HD-DVD; and a BD (Blu-ray Disc).

The distributed control program is to be stored to a processor-readable memory or the like, and executed by the processor. Thus, the various functions described in the embodiments are to be realized.

(11) Concerning "Specification of Range of Dates and Times"

In the display 6 illustrated in the bottom portion of FIG. 9, a ranking of images having comparatively high image importance degrees are displayed. However, the present invention is not limited to this, and display can be made of a ranking of people exhibiting high object importance degrees in the images.

Furthermore, focus can be put on other factors which are not elicited when using importance degrees calculated according to the entire group of images. More specifically, this is possible by narrowing down the target images to be used in the calculation of importance degrees. The narrowing down of target images may be realized by receiving a specification of a range of dates and times. The implementation of such a configuration enables displaying of images which are considered to be especially important during a specific time period, and displaying of a ranking which reflects human relationships during a specific time period.

Figure 27:
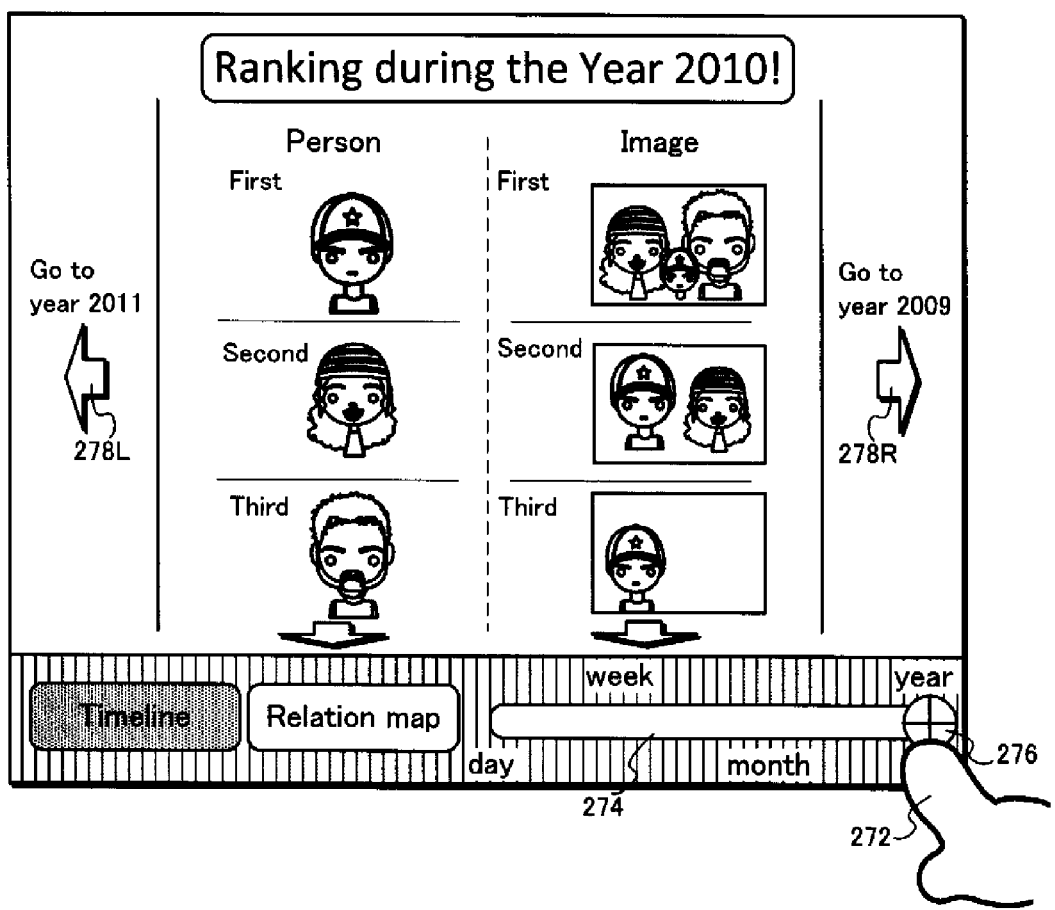
FIG. 27 illustrates an example of displaying of a ranking of people and images during a specified range of dates and times.

Illustration is made of one example of such a configuration in FIG. 27. FIG. 27 illustrates a screen 270. The screen 270 is a common touch screen display, where selection of arrows and icons can be performed by touching with a finger 272.

The screen 270 has a scale bar 274 at the right side of the bottom portion thereof. The scale bar 274 is provided with indicators of "year", "month", "week", and "day". In order to make a specification of dates and times, a user drags a circular button 276 in the left-right direction by touching the screen 270 with the finger 272 and sets the circular button to a desired point on the scale bar 274, and taps an arrow 278L or an arrow 278R, which are respectively located at the left side and right side of the screen 270.

In the example illustrated in FIG. 27, the year 2010 is currently specified as the range of dates and times. In this case, the object extracting unit 11 only extracts images which have been produced during the year 2010 (for instance, 2010/01/01/00:00-2010/12/31/23:59), from among the images obtained from the image acquiring unit 10. Further, the evaluating unit 48 calculates importance degrees of the images which have been produced during the year 2010. Hence, the display controlling unit 36 displays the calculated importance degrees on the screen. The "Ranking during the Year 2010!" illustrated in FIG. 27 is a result of such processing.

Such a method of first receiving a specification of a range of dates and times from a user and then calculating corresponding image importance degrees every time such a specification is made is one method which can be applied in the calculation of image importance degrees. Alternatively, a method may be applied of calculating and storing importance degrees in advance for each range of dates and times which may be specified.

Further, the way in which specifications of dates and times is received from the user is not limited to the receiving of touch input as illustrated in FIG. 27. That is, the specification of dates and times may be received in the form of numeral input made by the user via a keyboard.

(12) Concerning "A Link directed from a Cluster to an Image"

In embodiment 2, a fixed value was used as the value of the link directed from a cluster node of a certain person to an image in which the person appears. However, the present invention is not limited to this, and the value of such a link may be set according to an occupation degree.

Figure 28:
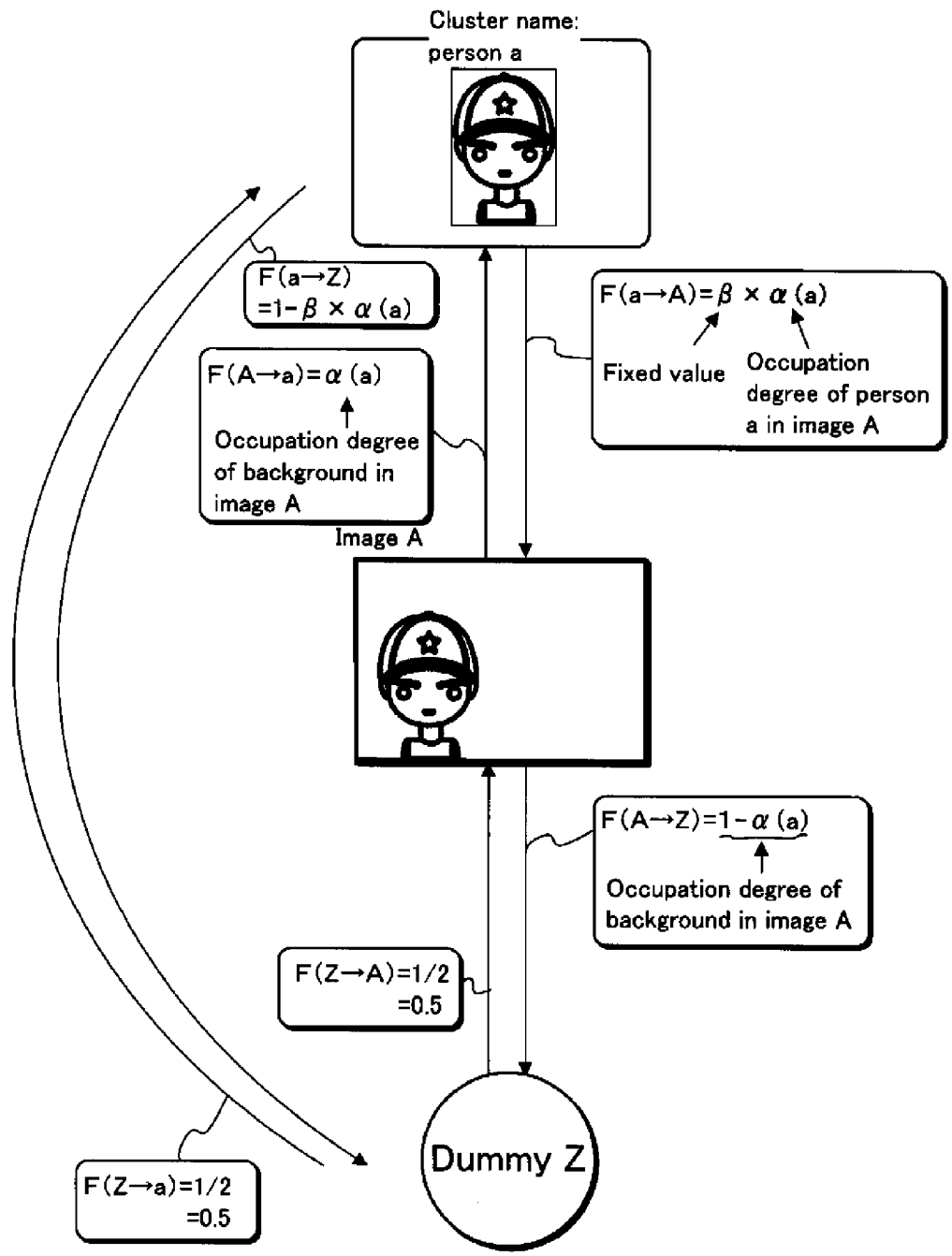
FIG. 28 provides an explanation of an example where links are set between image A, person a, and dummy Z.
Figure 29:
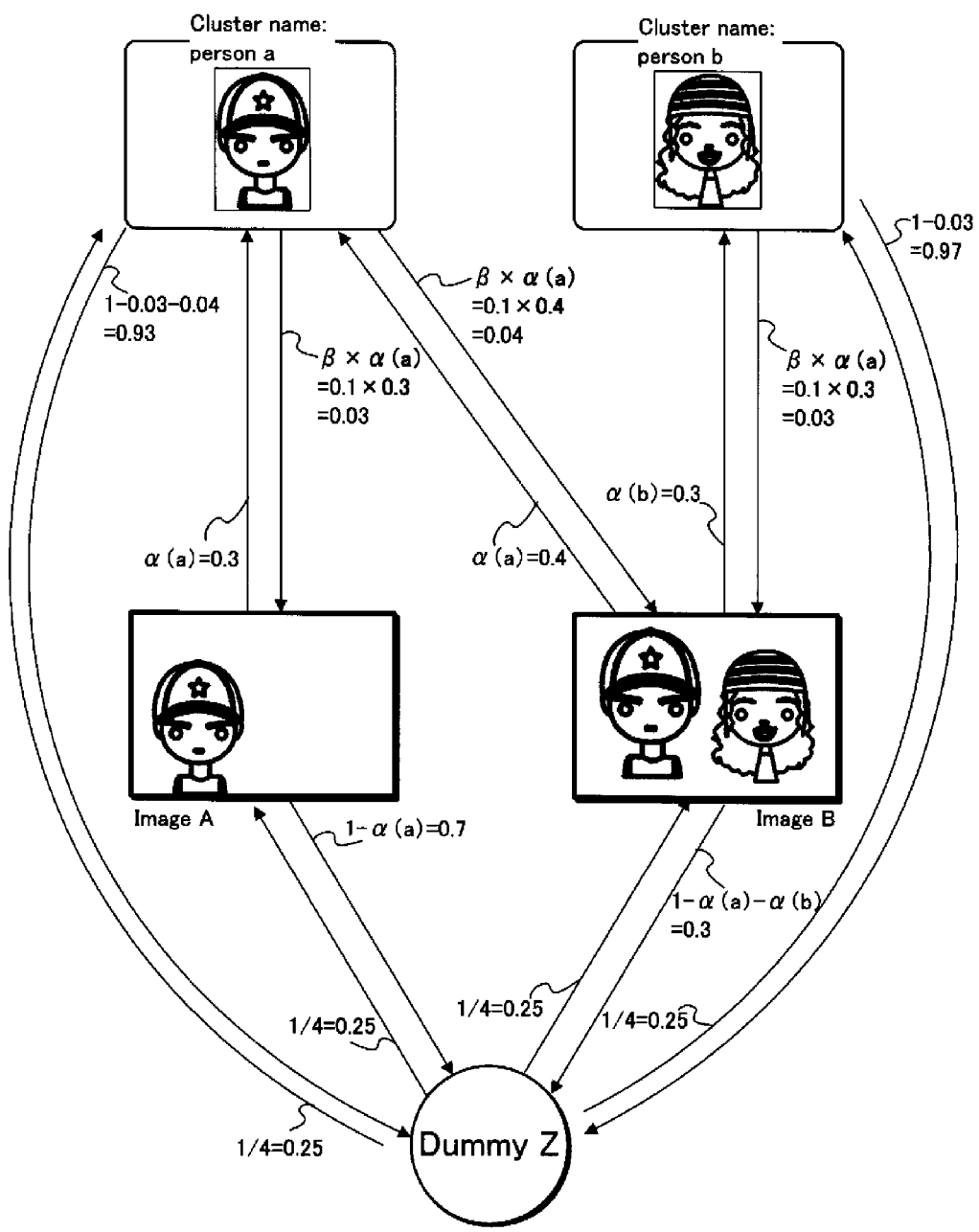
FIG. 29 provides an explanation of setting of links between five nodes, which are images A and B, persons a and b, and dummy Z.

For instance, configuration may be made where, as illustrated in FIG. 28, a value (F(a→A)) of a link directed from person a to image A is set so as to be directly proportional to an occupation degree α (a) of the person a in image A, by using an equation: F(a→A)=β×α(a). FIG. 29 illustrates the setting of links according to such a rule as provided in the above.

<Referenced Documents>

(1) Referenced Document 1

"Face Recognition Using Weighted Matching by Information of Gabor Features"

Kazuhiro Hotta (Saitama University (JSPS Research Fellow)) et al.

Technical report of IEICE (The Institute of Electronics, Information and Communication Engineers), HIP, Technical Committee on Human Information Processing, 100(34), pp. 31-38, 20000504

(2) Referenced Document 2

The PageRank citation ranking: Bringing order to the Web Page, Lawrence; Brin, Sergey; Motwani, Rajeev and Winograd, Terry (1999)

(3) Referenced Document 3

Japanese Patent Application Publication No. 2006-172417

[Industrial Applicability]

The present invention provides an image evaluation apparatus that enables a user to efficiently search for and find images which are important for the user, from among a vast collection of images owned by multiple users including the user and the user's family or the like. Compared to conventional image evaluation methods, the user is able to search for and view desired contents more easily and without trouble.

For instance, when a user is looking for an image representing his/her family which he/she could use for a new year card from among a vast amount of photo contents accumulated by his/her family, the user is able to easily select a desired image from search results generated according to a ranking of images. This renders the present invention useful in stationary terminal devices such as personal computers and server terminals. Further, the present invention is also useful in mobile terminals such as digital cameras and mobile phones.

REFERENCE SIGNS LIST 1, 101, 111 image evaluation system
2, 102, 112 image evaluation apparatus
4 SD memory card
6 display
10 image acquiring unit
11 object extracting unit
12 object characteristic value extracting unit
14 clustering unit
16 cluster information storing unit
18 object appearance characteristic value calculating unit
20 frequency degree calculating unit
22 occupation degree calculating unit
24 object appearance characteristic value storing unit
26 frequency degree storing unit
28 occupation degree storing unit
30 object importance degree calculating unit
32 image importance degree calculating unit
34a object importance degree information storing unit
34b image importance degree information storing unit
36 display controlling unit
40 graph generating unit
44a1 image and photo subject node generating unit
44a2 dummy node generating unit
44b1 photo subject link setting unit
44b2 Dummy link setting unit
46 graph storing unit
48 evaluating unit
50 adjacency matrix generating unit
52 dominant eigenvector calculating unit
53 importance degree calculating unit

The invention claimed is:

1. An image evaluation apparatus for evaluating each of a plurality of images, the images including objects that each belong to a cluster, the image evaluation apparatus comprising:

a first value calculating unit that calculates a first value pertaining to an object appearing in an image, of the plurality of images, according to a cluster that the object belongs to;

a second value calculating unit that calculates a second value indicating a degree of appearance of the object in the image; and an evaluating unit that calculates, according to the first value and the second value, an object importance degree and an image importance degree, wherein the evaluating unit (i) creates a graph including a link between the image and the object, the link indicating a relationship between the image and the object, and (ii) when a first object and a second object appear together in the image, calculates, by using the graph, the object importance degree for each of the first and second objects such that importance propagates from one of the first and second objects to another of the first and second objects, the evaluating unit includes:

an object importance degree calculating unit that calculates the object importance degree according to the first value and the second value; and an image importance degree calculating unit that calculates the image importance degree according to the object importance degree calculated by the object importance degree calculating unit, the first value calculating unit calculates a frequency degree as the first value, the frequency degree indicating a frequency at which one or more objects, belonging to a same cluster as the object, appear in the plurality of images, the second value calculating unit calculates an occupation degree as the second value, the occupation degree indicating a proportion of an area of the image that is occupied by the object, and the object importance degree calculating unit uses the frequency degree and the occupation degree in order to calculate the object importance degree.

2. The image evaluating apparatus of claim 1, wherein, when the image includes the first object and the second object:

the first value calculating unit calculates a first frequency degree indicating a frequency at which one or more objects, belonging to a same cluster as the first object, appear in the plurality of images, and a second frequency degree indicating a frequency at which one or more objects, belonging to a same cluster as the second object, appear in the plurality of images;

the second value calculating unit calculates a first occupation degree indicating a proportion of an area of the image that is occupied by the first object, and a second occupation degree indicating a proportion of an area of the image that is occupied by the second object;

the object importance degree calculating unit calculates the object importance degree of the first object according to the first frequency degree and the first occupation degree, and calculates the object importance degree of the second object according to the second frequency degree and the second occupation degree; and the image importance degree calculating unit calculates the image importance degree according to the object importance degree of the first object and the object importance degree of the second object.

3. The image evaluation apparatus of claim 1, wherein the object is a human face appearing in the image.

4. The image evaluation apparatus of claim 1, wherein each of the plurality of images is associated with a date and time of production, the image evaluation apparatus further comprises a receiving unit for receiving a specification of a range of dates and times from a user, and the first value calculating unit and the second value calculating unit perform respective calculations only when an image is associated with a date and time of production falling within the specified range of dates and times.

5. An image evaluation apparatus for evaluating each of a plurality of images, the images including objects that each belong to a cluster, the image evaluation apparatus comprising:

a first value calculating unit that calculates a first value pertaining to an object appearing in an image, of the plurality of images, according to a cluster that the object belongs to;

a second value calculating unit that calculates a second value indicating a degree of appearance of the object in the image; and an evaluating unit that calculates, according to the first value and the second value, an object importance degree and an image importance degree, wherein the evaluating unit (i) creates a graph including a link between the image and the object, the link indicating a relationship between the image and the object, and (ii) when a first object and a second object appear together in the image, calculates, by using the graph, the object importance degree for each of the first and second objects such that importance propagates from one of the first and second objects to another of the first and second objects, wherein, when a total number of the images to be evaluated is P (P being a natural number):

the first value calculating unit calculates Q (Q being a natural number) as the first value, Q denoting a total number of clusters that the objects appearing in the P images belong to; and the second value calculating unit calculates, for each of the objects appearing in the P images, a value indicating an appearance characteristic that the corresponding object exhibits in the corresponding one of the P images as the second value, wherein the image evaluation apparatus further comprises:

a node creating unit that creates nodes including: P image nodes corresponding to the P images; and Q cluster nodes corresponding to the Q clusters that the objects appearing in the P images belong to;

a link setting unit that sets a value of a link between an image node A corresponding to an image A and a cluster node a corresponding to a cluster a by using a second value pertaining to an object that appears in the image A and that belongs to the cluster a, where the image A is any one of the P images; and an adjacency matrix generating unit that generates an adjacency matrix representing the graph, the graph being constituted of the nodes created by the node creation unit and values of the links between the image nodes and the cluster nodes set by the link setting unit, and wherein the evaluating unit includes:

an eigenvector calculating unit that calculates a dominant eigenvector for the adjacency matrix; and an importance degree calculating unit that calculates an importance degree for each of the P images according to the dominant eigenvector.

6. The image evaluation apparatus of claim 5, wherein the link setting unit sets a value of a link directed from the image node A to the cluster node a by using the second value and sets a value of a link directed from the cluster node a to the image node A without using the second value.

7. The image evaluation apparatus of claim 6, wherein the second value calculated by the second value calculating unit is an occupation degree, the occupation degree indicating a proportion of an area that an object occupies in a corresponding one of the P images.

8. The image evaluation apparatus of claim 6, wherein the second value calculating unit calculates an occupation degree as the second value, the occupation degree indicating a proportion of an area of a corresponding one of the P images that is occupied by a background, the background being defined as an area of an image that does not include an object, the node creating unit further creates a dummy node Z, and the link setting unit sets a value of a link directed from the image node A to the dummy node Z by using the second value.

9. The image evaluation apparatus of claim 5, wherein the link setting unit sets a value of each of a link directed from the image node A to the cluster node a and a link directed from the cluster node a to the image node A by using the second value.

10. An image evaluation method for evaluating each of a plurality of images, the images including objects that each belong to a cluster, the image evaluation method comprising:

an acquiring step of acquiring information that indicates a cluster that an object, appearing in an image of the plurality of images, belongs to;

a first calculating step of calculating a first value pertaining to the object according to the cluster that the object belongs to;

a second calculating step of calculating a second value indicating a degree of appearance of the object in the image; and an evaluating step of calculating, according to the first value and the second value, an object importance degree and an image importance degree, wherein the evaluating step (i) creates a graph including a link between the image and the object, the link indicating a relationship between the image and the object, and (ii) when a first object and a second object appear together in the image, calculates, by using the graph, the object importance degree for each of the first and second objects such that importance propagates from one of the first and second objects to another of the first and second objects, the evaluating step includes:
- an object importance degree calculating step of calculating the object importance degree according to the first value and the second value; and
- an image importance degree calculating step of calculating the image importance degree according to the object importance degree calculated by the object importance degree calculating step, the first calculating step calculates a frequency degree as the first value, the frequency degree indicating a frequency at which one or more objects, belonging to a same cluster as the object, appear in the plurality of images, the second calculating step calculates an occupation degree as the second value, the occupation degree indicating a proportion of an area of the image that is occupied by the object, and the object importance degree calculating step uses the frequency degree and the occupation degree in order to calculate the object importance degree.

11. A non-transitory computer-readable recording medium having a program recorded thereon, the program for causing a computer to execute an evaluation method of processing each of a plurality of images, the images including objects that each belong to a cluster, the evaluation method comprising:

an acquiring step of acquiring information that indicates a cluster that an object, appearing in an image of the plurality of images, belongs to;

a first calculating step of calculating a first value pertaining to the object according to the cluster that the object belongs to;

a second calculating step of calculating a second value indicating a degree of appearance of the object in the image; and an evaluating step of calculating, according to the first value and the second value, an object importance degree and an image importance degree, wherein the evaluating step (i) creates a graph including a link between the image and the object, the link indicating a relationship between the image and the object, and (ii) when a first object and a second object appear together in the image, calculates, by using the graph, the object importance degree for each of the first and second objects such that importance propagates from one of the first and second objects to another of the first and second objects, the evaluating step includes:
- an object importance degree calculating step of calculating the object importance degree according to the first value and the second value; and
- an image importance degree calculating step of calculating the image importance degree according to the object importance degree calculated by the object importance degree calculating step, the first calculating step calculates a frequency degree as the first value, the frequency degree indicating a frequency at which one or more objects, belonging to a same cluster as the object, appear in the plurality of images, the second calculating step calculates an occupation degree as the second value, the occupation degree indicating a proportion of an area of the image that is occupied by the object, and the object importance degree calculating step uses the frequency degree and the occupation degree in order to calculate the object importance degree.

* * * * *